(12) United States Patent
Iihoshi et al.

(10) Patent No.: US 7,559,193 B2
(45) Date of Patent: Jul. 14, 2009

(54) CONTROL APPARATUS AND METHOD FOR INTERNAL COMBUSTION ENGINE

(75) Inventors: Yoichi Iihoshi, Tsuchiura (JP); Shin Yamauchi, Mito (JP); Toshio Hori, Hitachinaka (JP); Yoshikuni Kurashima, Mito (JP)

(73) Assignee: Hitachi, Ltd., Tokyo (JP)

( * ) Notice: Subject to any disclaimer, the term of this patent is extended or adjusted under 35 U.S.C. 154(b) by 163 days.

(21) Appl. No.: 11/589,890

(22) Filed: Oct. 31, 2006

(65) Prior Publication Data
US 2007/0095051 A1 May 3, 2007

(30) Foreign Application Priority Data
Nov. 1, 2005 (JP) .............................. 2005-318291

(51) Int. Cl.
*F01N 3/00* (2006.01)
(52) U.S. Cl. .............................. 60/285; 60/274; 60/276; 60/277
(58) Field of Classification Search ................... 60/274, 60/276, 277, 285
See application file for complete search history.

(56) References Cited

U.S. PATENT DOCUMENTS

| | | | |
|---|---|---|---|
| 5,207,056 A | | 5/1993 | Benninger |
| 5,473,888 A | * | 12/1995 | Douta et al. ................... 60/276 |
| 5,842,340 A | * | 12/1998 | Bush et al. ..................... 60/274 |
| 5,875,628 A | * | 3/1999 | Mitsutani ....................... 60/276 |
| 5,901,552 A | | 5/1999 | Schnaibel et al. |
| 6,446,429 B2 | * | 9/2002 | Kobayashi et al. ............. 60/285 |
| 6,877,311 B2 | * | 4/2005 | Uchida ........................ 60/277 |

FOREIGN PATENT DOCUMENTS

| | | |
|---|---|---|
| DE | 40 01 616 A1 | 7/1991 |
| DE | 196 06 652 A1 | 8/1997 |
| JP | 05-133264 A | 5/1993 |
| JP | 8-220051 A | 8/1996 |
| JP | 2002-81339 A | 3/2002 |
| JP | 2005-127259 A | 5/2005 |
| JP | 2005-163618 A | 6/2005 |
| JP | 2005-194891 A | 7/2005 |
| JP | 2005-337089 A | 12/2005 |

OTHER PUBLICATIONS

German Office Action dated Apr. 14, 2008 w/English translation (five (5) pages).

* cited by examiner

*Primary Examiner*—Binh Q Tran
(74) *Attorney, Agent, or Firm*—Crowell & Moring LLP

(57) ABSTRACT

A control apparatus for an internal combustion engine has an oxygen storage volume computing unit for computing an oxygen storage volume of a catalyst by using a real air/fuel ratio detected by an air/fuel ratio sensor installed on the upstream side of a catalyst, a center air/fuel ratio representing a stoichiometric air/fuel ratio and an estimated air flow volume or detecting a flow rate of air flowing into the catalyst. A center air/fuel ratio correcting unit for correcting a center air/fuel ratio based on output of a rear air/fuel ratio sensor provided on the downstream side of the catalyst, and an oxygen storage volume computed by an oxygen storage volume computing unit, and the oxygen storage volume computing unit computes an oxygen storage volume by using a center air/fuel ratio corrected by the center air/fuel ratio correcting unit.

10 Claims, 17 Drawing Sheets

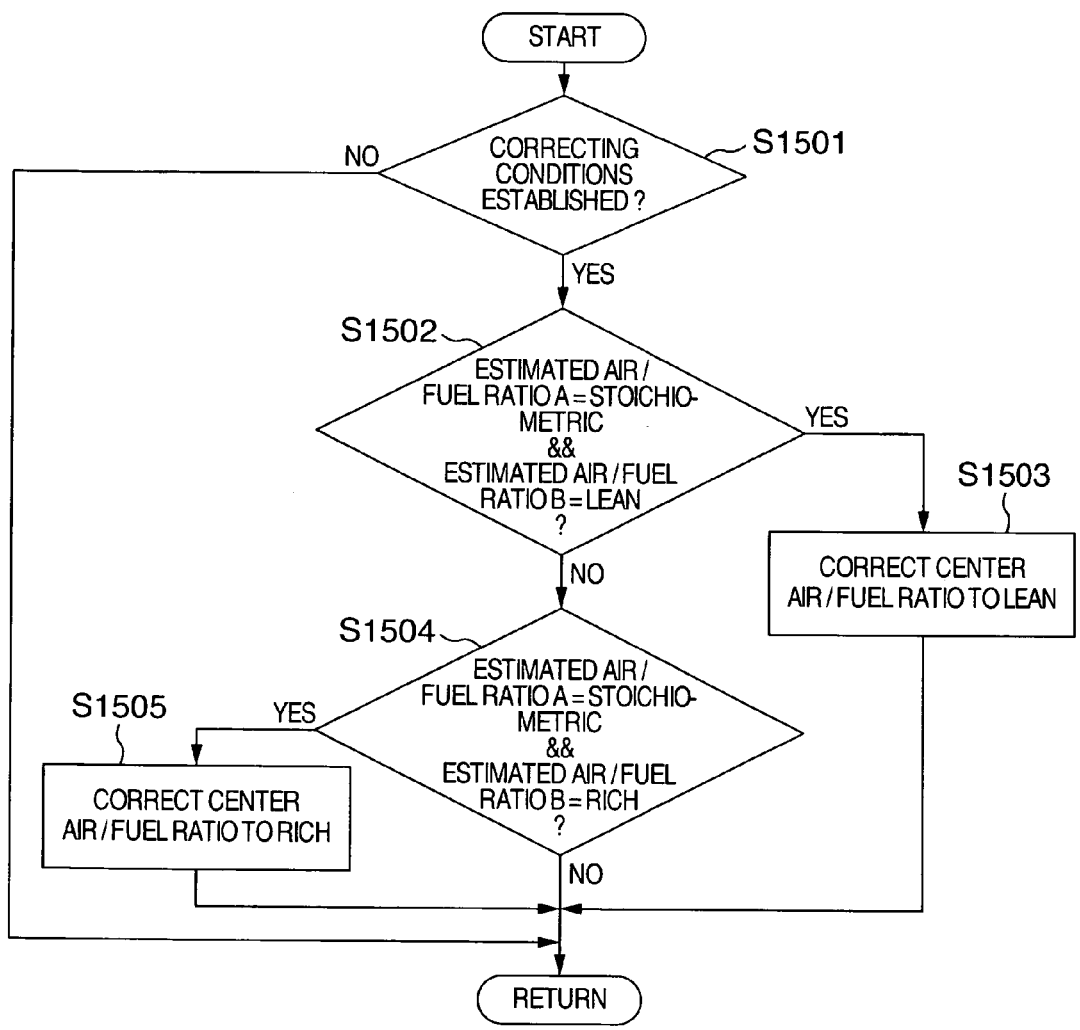

NORMAL STATE

CONTROL APPARATUS AND METHOD FOR INTERNAL COMBUSTION ENGINE

BACKGROUND OF THE INVENTION

The present invention relates to a control apparatus and a control method for an internal combustion engine, and more particularly to a control apparatus and a control method for an internal combustion engine, the control apparatus including means for controlling an air/fuel ratio and means for determining deterioration of the catalyst based on an oxygen storage volume of the catalyst.

Among control units for controlling the air/fuel ratio of an internal combustion engine, there is a type that computes an absolute volume of oxygen stored in a catalyst based on output of an air/fuel ratio sensor (an $O_2$ sensor or a linear air/fuel ratio sensor) for detecting exhaust components installed on the upstream side of the catalyst in the exhaust passage of the engine and also based on output of an airflow sensor for measuring a volume of air drawn into the combustion chamber of the engine, and that controls the air/fuel ratio based on an estimated oxygen storage volume of the catalyst (e.g., JP-A-2002-81339).

As a detector for detecting a degree of deterioration of the catalyst, there is a type that estimates an absolute volume of oxygen stored in the catalyst based on output of an air/fuel ratio sensor mounted on the downstream side of the catalyst, and detects deterioration of the catalyst based on this estimated value (e.g., JP-A-5-133264). In addition, there has been proposed a diagnosis unit for diagnosing deterioration of the air/fuel ratio sensor, which is designed to improve the robustness (anti-deterioration properties) of the air/fuel ratio sensor on the upstream side of the catalyst (e.g., JP-A-8-220051).

SUMMARY OF THE INVENTION

In the prior-art techniques described above, consideration was given to variation and deterioration of the air/fuel ratio sensor on the upstream side, but not much consideration was given to variation and fluctuation of the center air/fuel ratio of the catalyst.

As shown in FIG. 20, different data is obtained by the same type air/fuel ratio sensor. That is, the optimum air/fuel ratio (a center air/fuel ratio) at which the three pollutants HC, CO and NOx can be converted into harmless substances most effectively differs between the fresh catalyst and the used catalyst. However, this fact was not taken into sufficient consideration in the prior art.

As shown in FIG. 21A, if the deterioration of the catalyst is determined in terms of oxygen storage capacity when the air/fuel ratio is controlled from the lean state to the rich state, the accuracy of estimation of the oxygen storage volume is affected by error of the center air/fuel ratio as shown in FIG. 21B. This problem was not taken into serious consideration, either.

The present invention has been made in view of the problems described above and has as its object to provide a control apparatus for an internal combustion engine, including a center air/fuel ratio correcting unit for detecting a center air/fuel ratio on board vehicle, and improve the accuracy of estimation of an oxygen storage volume, to thereby improve the catalytic conversion efficiency and increase the catalyst diagnosis accuracy.

To achieve the above object, according to the present invention, a control apparatus for an internal combustion engine having an oxygen storage volume computing unit for computing an oxygen storage volume of a catalyst by using a real air/fuel ratio detected by a front air/fuel ratio sensor for detecting exhaust components, the front air/fuel ratio sensor being installed on the upstream side of the catalyst, a center air/fuel ratio, which is defined as a stoichiometric air/fuel ratio of the catalyst, and an intake air volume obtained by a unit for estimating or detecting a flow rate of air flowing into the catalyst, the control apparatus comprises an air/fuel ratio correcting unit for correcting the center air/fuel ratio based on output of a rear air/fuel ratio sensor installed on the downstream side of the catalyst and an oxygen storage volume computed by the oxygen storage volume computing unit.

In this configuration, the robustness of oxygen storage volume estimation to catalyst deterioration or sensor variation can be improved by providing a center air/fuel correcting unit, and the exhaust control performance and the catalyst diagnosis accuracy can be improved by controlling the air/fuel ratio by a corrected center air/fuel ratio.

To be more specific, the center air/fuel ratio correcting unit comprises a first catalyst air/fuel ratio estimating unit for estimating an air/fuel ratio in the catalyst based on output of the rear air/fuel ratio sensor; a second catalyst air/fuel ratio estimating unit for estimating an air/fuel ratio in the catalyst based on an oxygen storage volume computed by the oxygen storage volume computing unit; and a center air/fuel ratio correcting unit for correcting the center air/fuel ratio based on an estimated air/fuel ratio from the first catalyst air/fuel ratio estimating unit and an estimated air/fuel ratio outputted from the second catalyst air/fuel ratio estimating unit.

The center air/fuel ratio correcting unit corrects the center air/fuel ratio toward the lean side when an estimated air/fuel ratio by the first catalyst air/fuel ratio estimating unit is rich and an estimated air/fuel ratio by the second catalyst air/fuel ratio estimating unit is not rich, and corrects the center air/fuel ratio toward the rich side when the estimated air/fuel ratio by the first catalyst air/fuel ratio estimating unit is lean and the second catalyst air/fuel ratio estimating unit is not lean. Or, the center air/fuel ratio correcting unit corrects the center air/fuel ratio toward the lean side when the estimated air/fuel ratio by the first catalyst air/fuel ratio estimating unit is stoichiometric and the estimated air/fuel ratio by the second catalyst air/fuel ratio estimating unit is lean, and corrects the center air/fuel ratio toward the rich side when the estimated air/fuel ratio by the first catalyst air/fuel ratio estimating unit is stoichiometric and the estimated air/fuel ratio by the second catalyst air/fuel ratio estimating unit is rich.

As described above, the center air/fuel ratio can be corrected accurately by detecting a discrepancy between an estimated air/fuel ratio based on an oxygen storage volume and an estimated air/fuel ratio based on output of the rear air/fuel ratio sensor.

In this invention, in estimation of an oxygen storage volume through correction of the center air/fuel ratio, catalyst deterioration determination and fuel quantity correction (air/fuel control) are carried out. In this configuration, the accuracy of oxygen storage volume estimation is improved, which results in improvements in the determination accuracy of catalyst deterioration and the efficiency of catalytic conversion.

To above objects, according to the present invention, a control apparatus for an internal combustion engine, having an air/fuel ratio control unit for controlling an air/fuel ratio so that an air/fuel ration detected by a front air/fuel ratio sensor installed on the upstream side of a catalyst agrees with a target air/fuel ratio, the control apparatus comprises: an oxygen storage volume computing unit for computing an oxygen storage volume of the catalyst based on a volume of air flowing into the catalyst, a real air/fuel ratio, and a center air/fuel; a rich/lean determining unit for determining whether the air/fuel ratio is rich or lean based on output of a rear $O_2$ sensor on the downstream side of the catalyst; a center air/fuel ratio correcting unit for estimating the center air/fuel ratio based on an oxygen storage volume computed by the oxygen storage volume computing unit and output of the rear $O_2$ sensor; a first target air/fuel ratio correcting unit for correcting a target air/fuel ratio based on an oxygen storage volume computed by the oxygen storage volume computing unit; and a second target air/fuel ratio correcting unit for correcting the target air/fuel ratio when a rich/lean determination has been made by the rich/lean determining unit.

When a rich/lean determination has been made by the rich/lean determining unit, at least one of two correction processes is performed: either center air/fuel ratio correction by the center air/fuel ratio correcting unit or target air/fuel ratio correction intended to make output of the rear $O_2$ sensor stoichimetric by the second target air/fuel ratio correcting unit. Other than when a rich determination or a lean determination has been made by the rich/lean determining unit, the target air/fuel ratio is corrected to make the oxygen storage volume in the catalyst fall in a specified range by the first target air/fuel ratio correcting unit.

In this configuration, while performing air/fuel ratio control to minimize exhaust emission deterioration by using the target air/fuel ratio correcting unit or the center air/fuel ratio correcting unit when the exhaust components deteriorate, by implementing control to forestall the deterioration of the exhaust gas, high catalytic conversion efficiency can be achieved.

To achieve the above objects, according to the present invention, the control apparatus for an internal combustion engine comprises: a diagnosis permit determining unit for determining whether to issue a permit to diagnose the catalyst based on a running condition; a diagnosis-stages control unit for controlling a diagnosis process based on an oxygen storage volume computed by the oxygen storage volume computing unit and output of the rear $O_2$ sensor; a target air/fuel ratio change-over unit for changing over the target air/fuel ratio based on output of the diagnosis-stages control unit; an oxygen storage capacity computing unit for computing the oxygen storage capacity in the catalyst during execution of change-over of the air/fuel ratio; and a catalyst deterioration determination unit for determining the deterioration of the catalyst based on the oxygen storage capacity.

The diagnosis-stages control unit (1702) controls the diagnosis-stages based on either output of the rear air/fuel ratio sensor or the oxygen storage volume.

In this configuration, by controlling the diagnosis-stages based on an oxygen storage volume computed with high accuracy by estimating a center air/fuel ratio, the catalyst can be diagnosed by minimizing the exhaust deterioration to a minimum.

Furthermore, to achieve the above objects, according to the present invention, a control method of an internal combustion engine having an oxygen storage volume computing unit for computing an oxygen storage volume in the catalyst by using a real air/fuel ratio detected by a front air/fuel ratio sensor for detecting exhaust components, installed on the upstream side of the catalyst, a center air/fuel ratio representing a stoichiometric air/fuel ratio of the catalyst, and an intake air volume obtained by a unit for estimating or detecting a flow rate of air flowing into the catalyst, the control method comprising correcting the center air/fuel ratio by output of a rear air/fuel ratio sensor installed on the downstream of the catalyst and an oxygen storage volume computed by the oxygen storage volume computing unit.

According to the present invention, the center air/fuel ratio of the catalyst can be estimated (corrected) with high accuracy and quickly. Because the oxygen storage volume in the catalyst is obtained more accurately than before, exhaust control with catalytic conversion efficiency kept constantly high can be realized. Moreover, the adequate control of oxygen storage volume prevents exhaust deterioration during diagnosis.

Other objects, features and advantages of the invention will become apparent from the following description of the embodiments of the invention taken in conjunction with the accompanying drawings.

BRIEF DESCRIPTION OF THE DRAWINGS

FIG. 8 is a flowchart showing another embodiment of the center air/fuel ratio correction process by the center air/fuel ratio correcting unit.

DESCRIPTION OF THE EMBODIMENTS

Embodiments of a control apparatus for an internal combustion engine of the present invention will be described with reference to the drawings.

Figure 1:
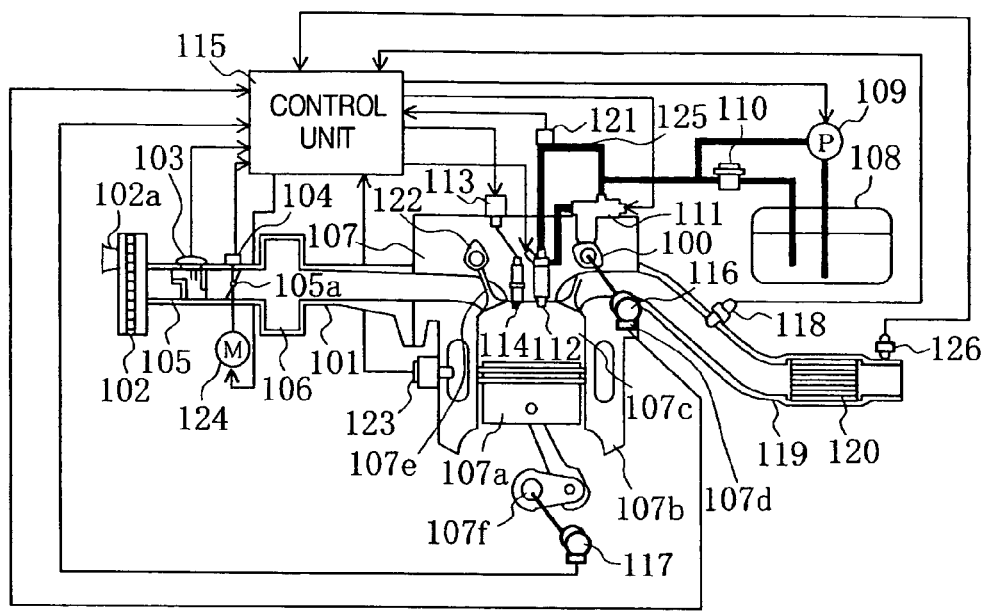
FIG. 1 is a construction diagram of a general configuration of a control apparatus for a cylinder injection type internal combustion engine to which the control apparatus for an internal combustion engine in the present invention is applied.

FIG. 1 shows a general configuration of a control system for cylinder injection type internal combustion engine to which the control apparatus for an internal combustion engine according to the present invention.

An engine 107 has a plurality of combustion chambers, which are demarcated by a cylinder block 107B and pistons 107A.

Air drawn into a combustion chamber 107C of the engine 107 is taken from an inlet 102A of an air cleaner 102, and the air passes through an airflow sensor 103, which is one of the running condition measuring unit of the internal combustion engine, then goes through a throttle body 105, which contains an electric control throttle valve 105A for controlling an intake air flow rate, and enters a collector 106. The electric control throttle valve is driven and has its opening set by an electric motor 124.

The airflow sensor 103 outputs a signal representing an intake airflow rate to a control unit 115. The throttle body 105 has mounted therein a throttle sensor 104 for detecting the opening of the electric control throttle valve 105A, which is one of the running condition measuring unit of the internal combustion engine. The throttle sensor 104 outputs a signal, representing the opening of the electric control throttle valve 105A, to the control unit 115.

The air drawn into the collector 106 is distributed to each combustion chamber 107C by an intake pipe 101 connected to the cylinder block 107B.

A fuel, such as gasoline, which is supplied from a fuel tank 108, is primarily pressurized by a fuel pump 109, then the fuel has its pressure adjusted to a certain pressure by a fuel pressure regulator 110, and secondarily pressurized to a high pressure by a high pressure fuel pump 111, and supplied to a common rail 125. The high-pressure fuel is directly injected into each combustion chamber 107C by an injector 112 provided at a respective combustion chamber 107C.

The common rail 125 is fitted with a fuel pressure sensor 121 for detecting a pressure of a high-pressure fuel. The fuel pressure sensor 121 outputs a signal, representing a pressure of a high-pressure fuel, to the control unit 115.

On the cylinder block 107B, an ignition plug 114 is mounted for each combustion chamber 107C. The fuel injected to the combustion chamber 107C is ignited by the ignition plug 114 when an ignition signal at high voltage produced by the ignition coil 113 is fed to the ignition plug 114.

A cam angle sensor 116 is mounted on the cam shaft 100 of an exhaust valve 107D. The cam angle sensor 116 outputs a signal for detecting the phase of the cam shaft 100 to the control unit 115. The cam angle sensor 116 may be mounted on a cam shaft 122 of an intake valve 107E.

To detect the rotation and the phase of a crank shaft 107F of the engine 107, a crank angle sensor 117 is mounted on the crank shaft 107F. The crank shaft angle sensor 117 outputs a signal, representing the rotation and the phase of the crank shaft 107F, to the control unit 115.

A catalyst 120 is provided in an exhaust pipe 119. A linear air/fuel ratio sensor (front air/fuel ratio sensor) 118 is provided on the upstream side of the catalyst (catalytic converter) 120. The linear air/fuel ratio sensor 118 quantitatively detects oxygen in the exhaust gas, and outputs a detection signal to the control unit 115. A rear $O_2$ sensor (rear air/fuel ratio sensor) 126 for detecting if there is oxygen in the exhaust gas or not is mounted on the downstream of the catalyst 120. The rear $O_2$ sensor 126 outputs a signal representing presence or absence of oxygen in exhaust gas to the control unit 115.

The present invention has been described referring to a cylinder injection type internal combustion engine. The present invention is not limited to this type of engine but may also be applied to a port injection type internal combustion engine in which the injectors 112 are mounted to the intake ports.

Figure 2:
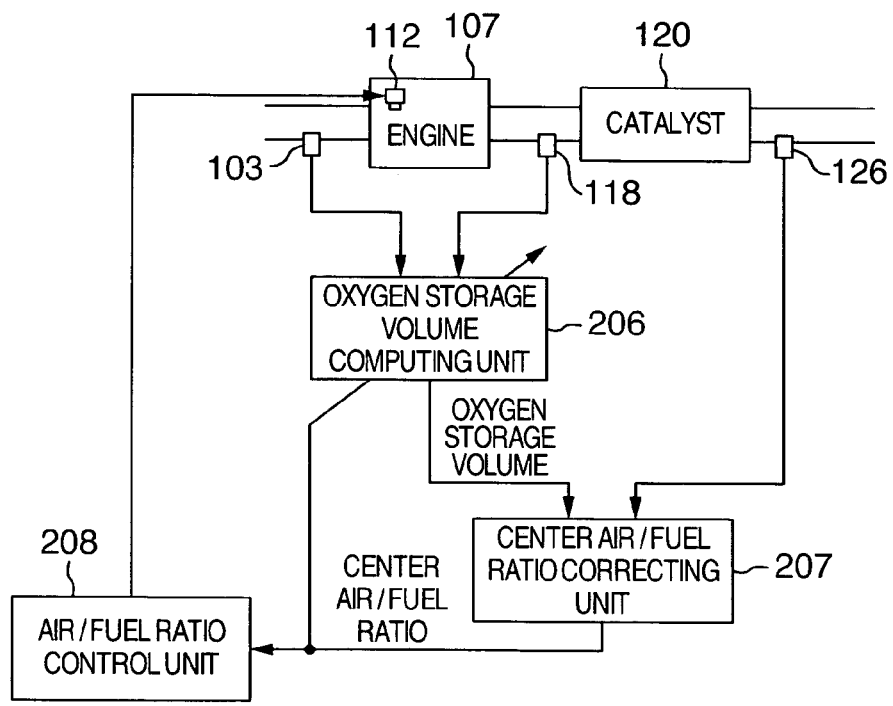
FIG. 2 is a block diagram showing a general configuration of a general outline of an embodiment of the control apparatus for an internal combustion engine (engine control apparatus) in the present invention.

FIG. 2 shows a general outline of an embodiment of a control apparatus for an internal combustion engine (engine control apparatus) according the present invention.

This engine control apparatus can be realized by using a control unit 115 by electronic control via a microcomputer and includes an oxygen storage volume computing unit 206, a center air/fuel ratio correcting unit 207, and an air/fuel ratio control unit 208.

The oxygen storage volume computing unit 206 performs a computation of intake air volume×(real air/fuel ratio−center air/fuel ratio) based on outputs (real air/fuel ratios) of the air flow sensor 103 for measuring an intake air volume of the engine 107 and the linear air/fuel ratio sensor 118 installed on the upstream side of the catalyst 120 at every cycle, that is, at every cycle of control, for example, and adds up computation results to thereby obtain oxygen storage volume (VOS) stored in the catalyst 120.

Since an intake air volume is equal to a flow rate of air flowing into the catalyst 120, the flow rate of air flowing into the catalyst 120 is computed here by using a volume of intake air from the air flow sensor 103 corresponding to an air flow rate, to compute an oxygen storage volume. The oxygen storage volume may be computed by using an air volume obtained by estimating a flow rate of air flowing into the catalyst 120 by an estimating unit.

The present invention is characterized by providing a center air/fuel ratio correcting unit 207 for correcting the center air/fuel ratio used in computing the oxygen storage volume by using an oxygen storage volume and output of the rear $O_2$ sensor 126 installed on the downstream of the catalyst 120.

By making the above arrangement, a center air/fuel ratio can be estimated accurately even if the center air/fuel ratio has changed due to deterioration of the catalyst 120 or even if an offset has occurred in the rear air/fuel ratio sensor 118 on the upstream side of the catalyst 120 owing to a variation or deterioration of the sensor.

The air/fuel ratio control unit 208 controls the air/fuel ratio based on a center air/fuel ratio which is corrected by the center air/fuel ratio correcting unit 207. The air/fuel ratio control unit 208 controls the air/fuel ratio of an air-fuel mixture supplied to the combustion chamber 107C, in other words, controls a fuel injection quantity by the injector 112 so that an air/fuel ratio detected by the linear air/fuel ratio sensor 118 agrees with the center air/fuel ratio.

In the present invention, the center air/fuel ratio is corrected based on output of the rear $O_2$ sensor 126 used as a standard, which is located on the downstream side of the catalyst, and because an oxygen storage volume is used, which is a difference from the prior art, the center air/fuel ratio can be corrected even during a transient operation. Therefore, the center air/fuel ratio can be corrected more quickly and accurately than before.

Because the center air/fuel ratio is corrected quickly and accurately, air/fuel ratio control by the air/fuel ratio control unit 208 using a center air/fuel ratio is performed accurately and adequately, with the result that the catalytic conversion efficiency is improved.

Figure 3:
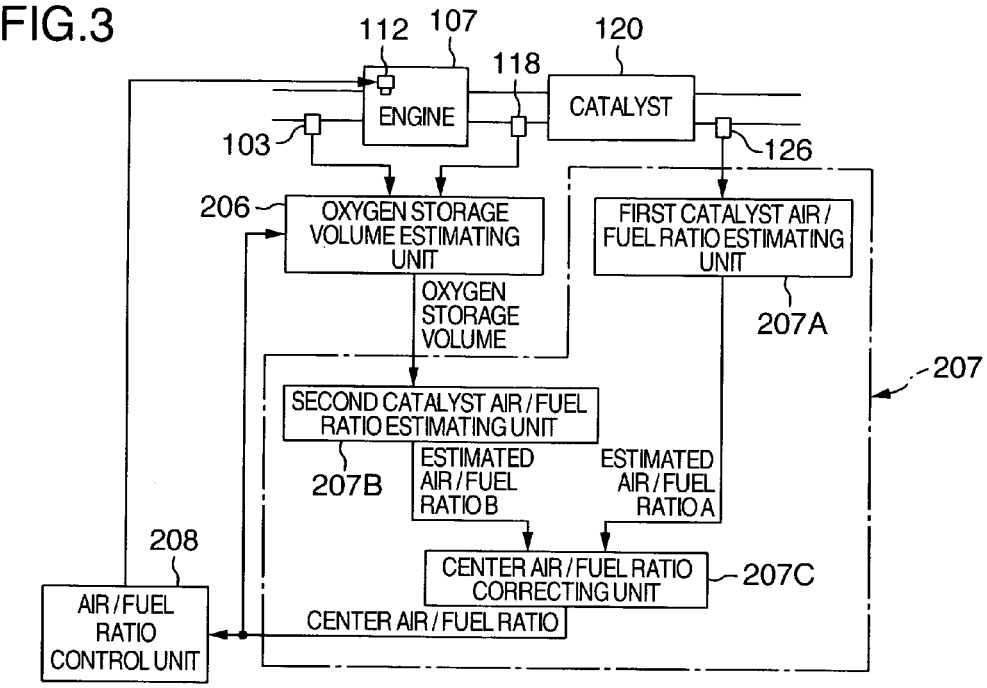
FIG. 3 is a block diagram showing details of a center air/fuel ratio correcting unit according to the embodiment.

FIG. 3 shows details of the center air/fuel ratio correcting unit 207. The center air/fuel ratio correcting unit 207 includes a first catalyst air/fuel ratio estimating unit 207A, a second catalyst air/fuel ratio estimating unit 207B, and a center air/fuel ratio correcting unit 207C.

Figure 4A:
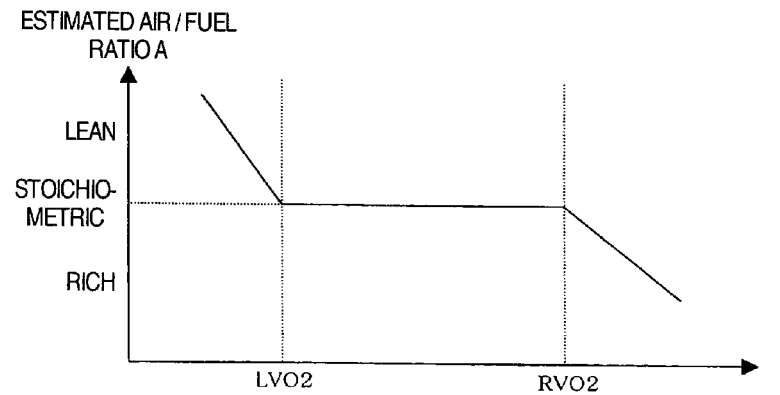
FIG. 4A is a graph showing air/fuel ratio estimation characteristic by a first catalyst by a first catalyst air/fuel ratio estimating unit.

The first catalyst air/fuel ratio estimating unit 107A estimates an estimated air/fuel ratio A from a voltage value VO2 outputted by the rear $O_2$ sensor 126. As shown in FIG. 4A, if a voltage value VO2 of the rear $O_2$ sensor 126 is within a predetermined range (from LVO2 to RVO2), an estimated air/fuel ratio A is defined as stoichiometric, or if the voltage value VO2 is smaller than a lean determination voltage LOV2, the estimated air/fuel ratio A is determined as lean, of if the voltage value VO2 is larger than a rich determination voltage RVO2, the estimated air/fuel ratio A is determined as rich.

Incidentally, the lean determination voltage LVO2 or the rich determination voltage RVO2 may be determined by an output value of the rear $O_2$ sensor when catalytic conversion efficiency is higher than a predetermined value during a steady operation, and generally, the determination voltages will be LVO2=0.6V or so or RVO2=0.8V or so, depending on the conditions.

Figure 4B:
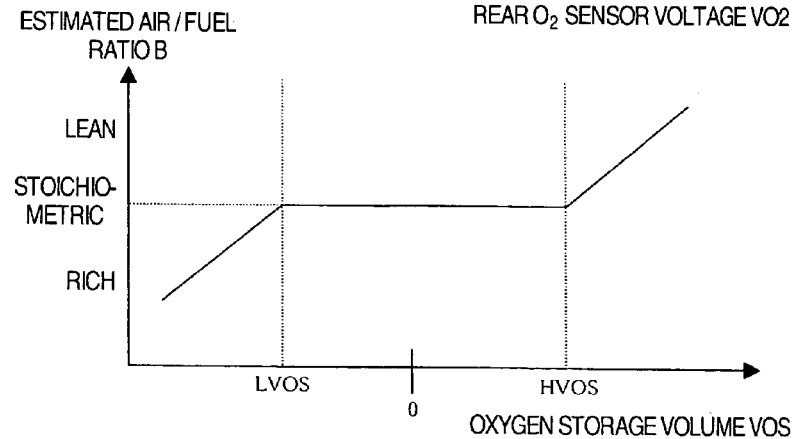
FIG. 4B is a graph showing air/fuel ratio estimation characteristic by a second catalyst air/fuel ratio estimating unit.

The second catalyst air/fuel ratio estimating unit 207B estimates an estimated air/fuel ratio B by using an oxygen storage volume VOS inputted by the oxygen storage volume computing unit 206. As shown in FIG. 4B, if an oxygen storage volume VOS inputted by the oxygen storage volume computing unit 206 is between a lower limit oxygen storage volume determination level (lower limit volume VOS) LVOS and a higher limit oxygen storage volume determination level HVOS, an estimated air/fuel ratio B is defined as stoichiometric, or if the oxygen storage volume VOS is smaller than the lower limit oxygen storage determination level LVOS, the estimated air/fuel ratio B is determined as lean, or if the oxygen storage volume VOS is larger than the higher limit oxygen storage volume determination level HVOS, the estimated air/fuel ratio B is determined as lean.

The lower limit oxygen storage volume determination level LVOS and the higher limit oxygen storage volume determination level HVOS are control design values, and these higher and lower limits may be used as threshold values when confining the oxygen storage volume VOS within a predetermined range, for example. For the base value 0 for oxygen storage volume VOS, a half of either an oxygen storage value when output of the rear $O_2$ sensor crosses the base value (0.7V, for example) may be used or an oxygen storage capacity which is computed in catalyst diagnosis may be used.

Each of the estimated air/fuel ratios A and B is here divided into three levels, rich, stoichiometric, and lean, but they may be divided into more different levels.

An embodiment of center air/fuel ratio correction performed by the center air/fuel ratio correcting unit 207 will be described with reference to the flowchart in FIG. 5.

In step S401, it is determined whether or not conditions for correcting a center air/fuel ratio have been established, and if the conditions have been established, steps from S402 on are executed, or if the conditions have not been established, the process is terminated.

The conditions for correcting a center air/fuel ratio include that the air/fuel ratio sensors before and after the catalyst are free from failure and that a duration time, in which an estimated air/fuel ratio A by the first catalyst air/fuel ratio estimating unit 207A is stoichiometric, is longer than a predetermined time (30 sec), for example.

In step S402, it is determined if an estimated air/fuel ratio B is rich when an estimated air/fuel ratio A has become rich.

If an estimated air/fuel ratio B is not rich when an estimated air/fuel ratio A has become rich, the process proceeds to step S403, the center air/fuel ratio is corrected.

In step S403, a center air/fuel ratio, which has been displaced to the rich side, is corrected toward the lean side.

On the other hand, in step S402, if it is determined that an estimated air/fuel ratio B is rich when an estimated air/fuel ratio A has become rich, the process moves on to step S404, in which it is determined whether or not the estimated air/fuel ratio B is lean when the estimated air/fuel ratio A has become lean.

If an estimated air/fuel ratio B is not lean when an estimated air/fuel ratio A has become lean, the process goes to step 405 in which the center air/fuel rich is corrected.

In step S405, a center air/fuel ratio, which has been displaced to the lean side, is corrected toward the rich side.

Incidentally, in steps S403 and S405, a correction amount for a center air/fuel ratio may always be the same, predetermined value or a value proportional to a difference between a lower limit oxygen storage volume determination level LVOS and an oxygen storage volume VOS. To raise the sensitivity of prevention of deterioration of Nox, a lean correction amount may be smaller than a rich correction amount. Conversely, to raise the sensitivity of prevention of deterioration of HC and CO, a lean correction amount may be larger than a rich correction amount.

Figure 5:
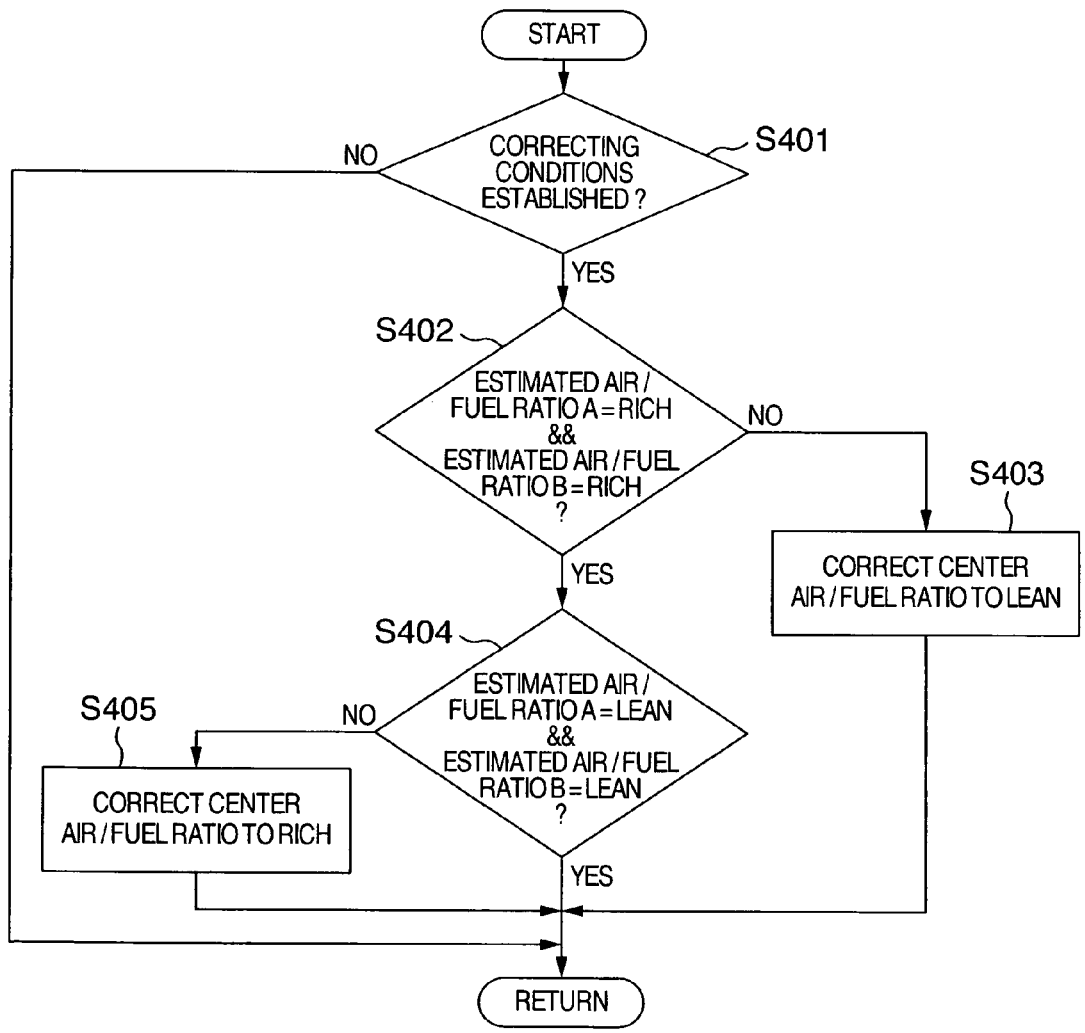
FIG. 5 is a flowchart showing an embodiment of center air/fuel ratio correction by the center air/fuel ratio correcting unit of the embodiment.
Figure 6A:
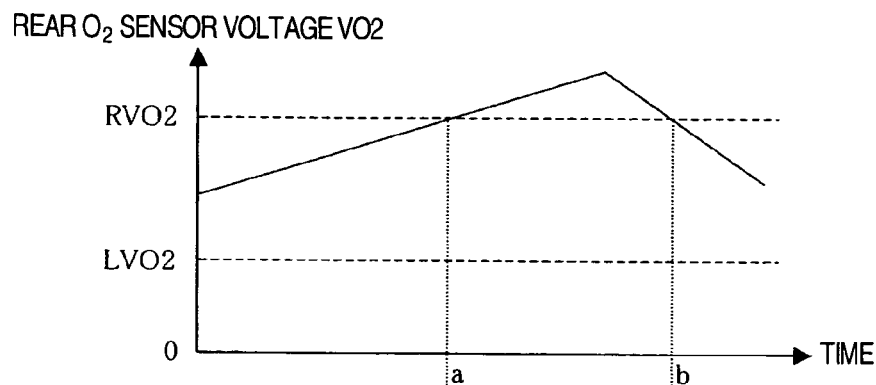
FIGS. 6A, 6B, and 6C are examples of time charts when a center air/fuel ratio estimating process shown in FIG. 5 was executed, in which FIG. 6A indicates rear $O_2$ sensor voltage, FIG. 6B indicates oxygen storage volume, and FIG. 6C indicates center air/fuel ratio and real air/fuel ratio.
Figure 6B:
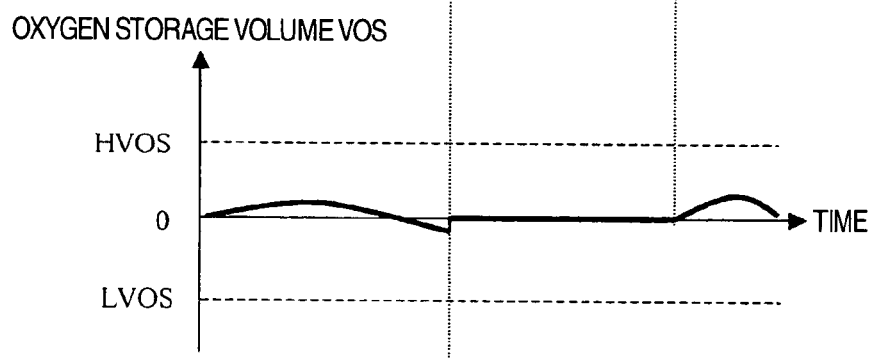
Figure 6C:
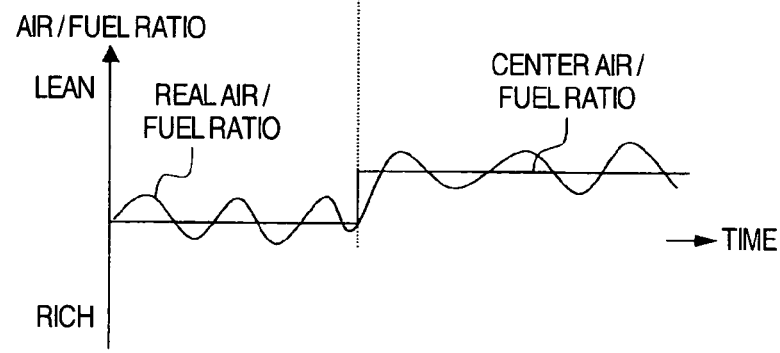

FIGS. 6A, 6B and 6C show examples of time charts when a center air/fuel ratio estimating process in FIG. 5 was executed.

In the time charts, at time a when the rear $O_2$ sensor voltage VO2 exceeds the rich determination voltage RVO2, an oxygen storage volume VOS is higher than the lower limit oxygen storage volume determination level LVOS, for which reason the center air/fuel ratio is corrected to the lean side. For a while until time b when the rear $O_2$ sensor voltage VO2 becomes lower than the rich determination voltage RVO2, an error in the oxygen storage volume is reduced by resetting the oxygen storage volume VOS to 0.

Figure 7A:
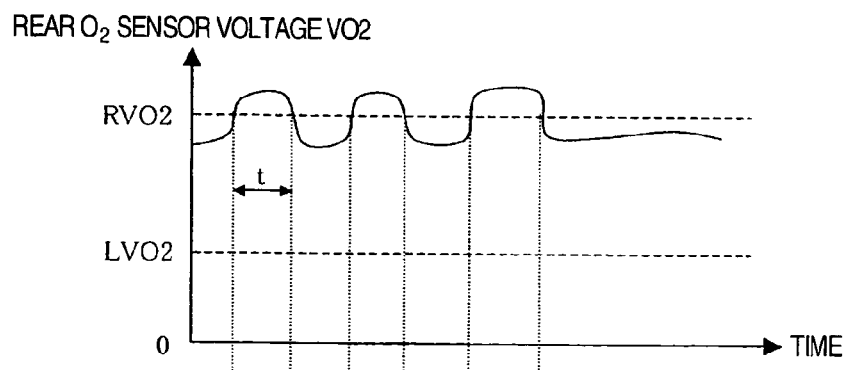
FIGS. 7A, 7B, and 7C are other examples of time charts when the center air/fuel ratio estimating process shown in FIG. 5 was executed, in which FIG. 7A indicates the rear $O_2$ sensor voltage, FIG. 7B indicates the oxygen storage volume, and FIG. 7C indicates the center air/fuel ratio and the real air/fuel ratio.
Figure 7B:
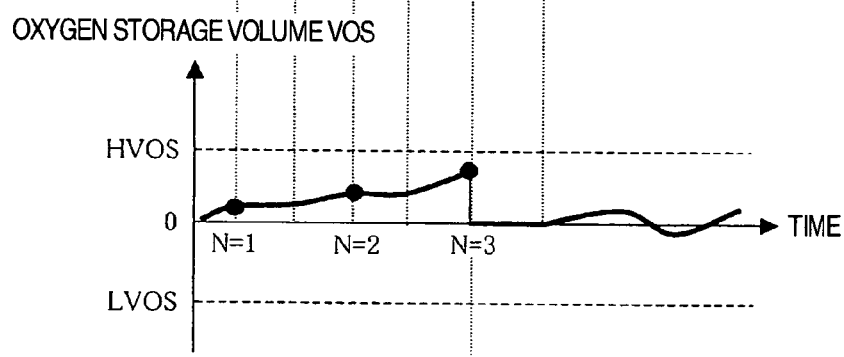
Figure 7C:
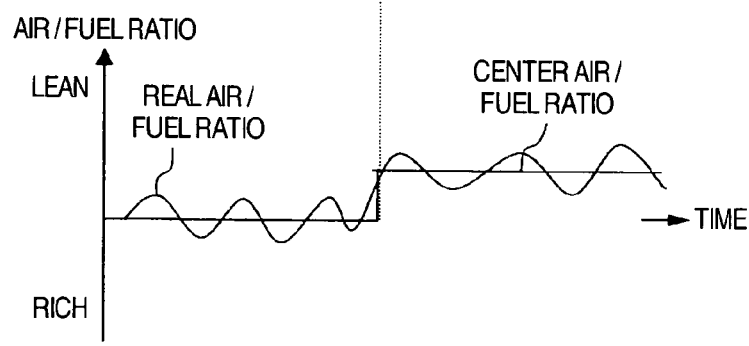

FIGS. 7A to 7C are other examples of time charts when the center air/fuel ratio estimating process in FIG. 5 was executed.

In the time chart, the rear $O_2$ sensor voltage VO2 crosses the rich determination voltage RVO2 at short time intervals t. While an estimated air/fuel ratio A is rich at N=1, 2 and 3, an estimated air/fuel ratio by an oxygen storage volume VOS is stoichiometric consistently. Therefore, by resetting the oxygen storage volume VOS to 0 when N=3, and the center air/fuel ratio is corrected toward the lean side.

Another embodiment of the center air/fuel ratio correcting process by the center air/fuel ratio correcting unit 207 will be explained with reference to the flowchart in FIG. 8.

In step S1501, it is determined whether or not the conditions for correcting a center air/fuel ratio have been established. If the conditions for correcting a center air/fuel ratio have been established, steps from S1502 on are executed, or if the conditions for correcting a center air/fuel ratio have not been established, the process is terminated.

Like in the above-mentioned embodiment, the conditions for correcting an air/fuel ratio include that there is nothing wrong with the air/fuel ratio sensors upstream on the downstream of the catalyst and that a duration time in which an estimated air/fuel ratio A by the first catalyst air/fuel ratio estimating unit 207A is stoichiometric is longer than a predetermined time (30 sec), for example.

In step 1502, it is determined if an estimated air/fuel ratio B is lean when an estimated air/fuel ratio A is stoichiometric.

If an estimated air/fuel ratio has become lean when an estimated air/fuel ratio A is stoichiometric, the process proceeds to step S1503, and a center air/fuel ratio is corrected.

In step S1503, the center air/fuel ratio, which has been displaced to the rich side, is corrected to the lean side.

On the other hand, in step S1502, if it is determined that an estimated air/fuel ratio B is not lean when an estimated air/fuel ratio A is stoichiometric, the process goes to step S1504, in which it is determined if the estimated air/fuel ratio B is rich when the estimated air/fuel ratio A is stoichiometric.

If an estimated air/fuel ratio B has become rich when an estimated air/fuel ratio A is stoichiometric, the process goes to step S1505, in which the center air/fuel ratio is corrected.

In step S1505, the center air/fuel ratio, which has been displaced to the lean side, is corrected to the rich side.

Incidentally, in steps S1503 and S1505, a correction amount for a center air/fuel ratio may always be the same, predetermined value or a value proportional to a difference between a lower limit oxygen storage volume determination level LVOS and an oxygen storage volume VOS. To improve the sensitivity of prevention of deterioration of Nox, correction amounts may be in a relation that a lean correction amount is smaller than a rich correction amount. Conversely, to improve the sensitivity of prevention of deterioration of HC and CO, correction amounts may be in a relation that a lean correction amount is larger than a rich correction amount.

Figure 9A:
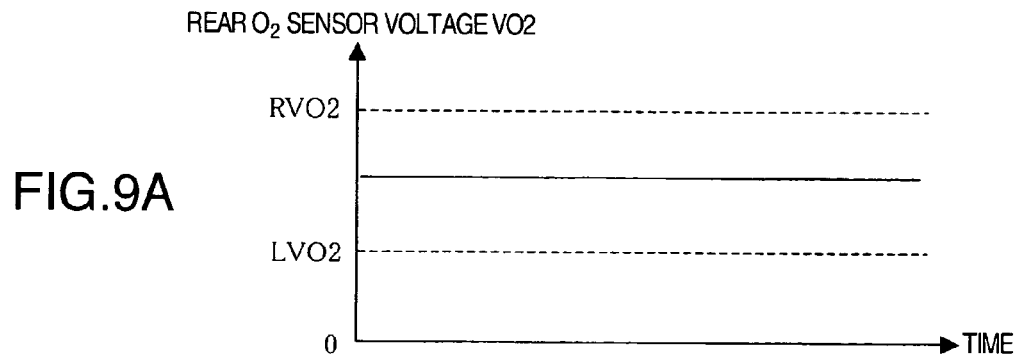
FIGS. 9A, 9B, and 9C are examples of time charts when the center air/fuel ratio estimating process shown in FIG. 8 was executed, in which FIG. 9A indicates the rear $O_2$ sensor voltage, FIG. 9B indicates the oxygen storage volume, and FIG. 9C indicates the center air/fuel ratio and the real air/fuel ratio.
Figure 9B:
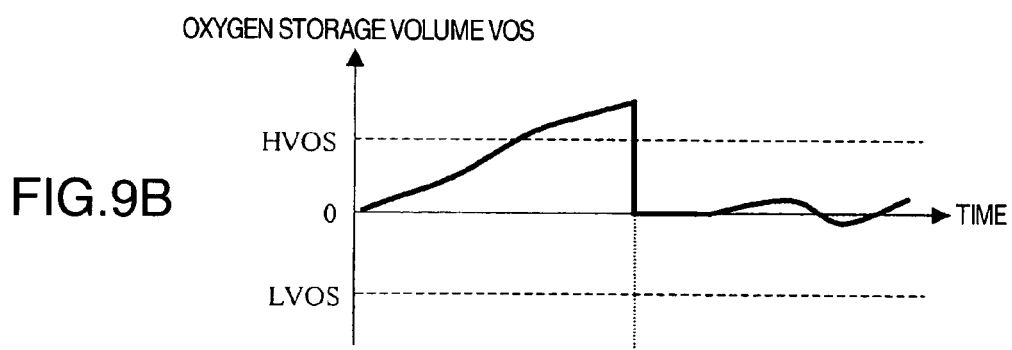
Figure 9C:
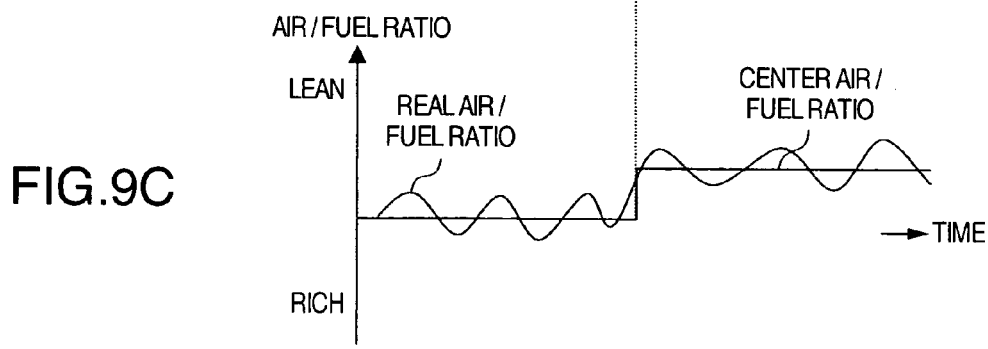

FIGS. 9A to 9C are examples of time charts when the center air/fuel ratio estimating process shown in FIG. 8 was executed.

In the time charts, an estimated air/fuel ratio A is stoichiometric (a rear $O_2$ sensor VO2 is between the rich determination voltage RVO2 and the lean determination voltage LVO2), but since an estimated air/fuel ratio B is lean (an oxygen storage volume is larger than HVOS), the center air/fuel ratio is corrected toward the lean side.

Figure 10:
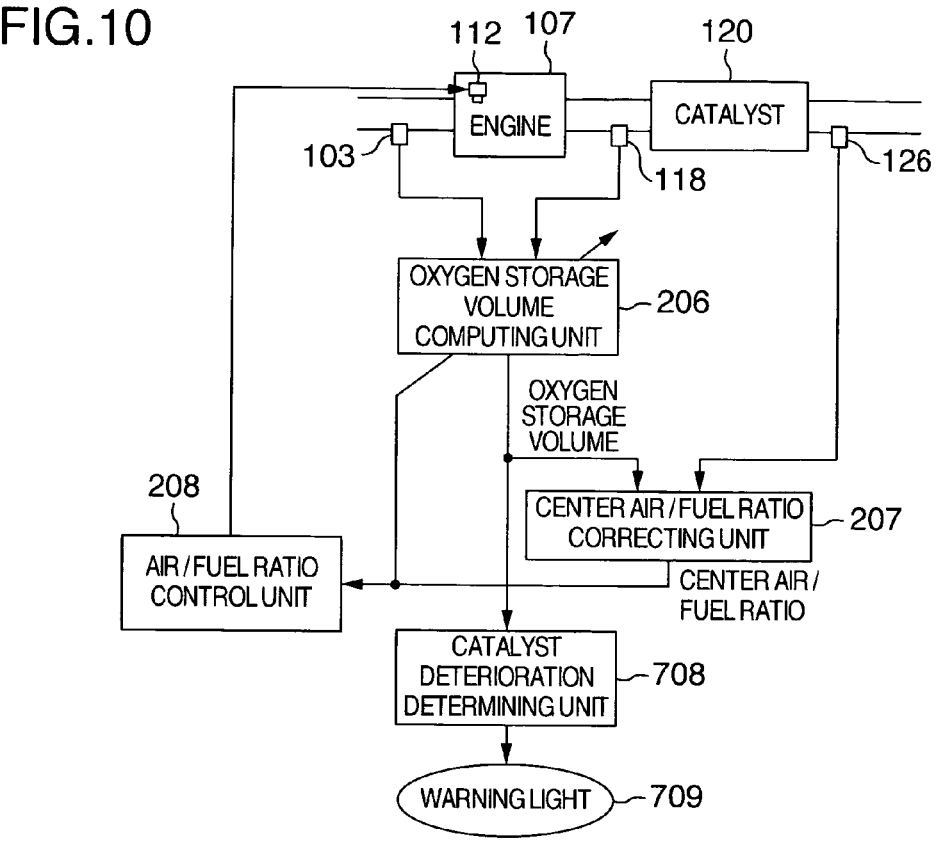
FIG. 10 is a block diagram showing a general outline of a still other embodiment of the control apparatus for an internal combustion engine according to the present invention.

FIG. 10 shows a general outline of another embodiment of the control apparatus for an internal combustion engine according to the present invention.

In this embodiment, an engine control apparatus comprises a catalyst deterioration determining unit 708 in addition to the oxygen storage volume computing unit 206, the center air/fuel ratio correcting unit 207, and the air/fuel ratio control unit 208.

The catalyst deterioration determining unit 708 determines deterioration of the catalyst based on an oxygen storage volume computed by the oxygen storage volume computing unit 206. When the catalyst deterioration determining unit 708 has determined that the catalyst deteriorated, a warning light 79 comes on.

In this embodiment, the center air/fuel correcting unit 207 corrects a center air/fuel ratio, which is used in computation of an oxygen storage volume, and the oxygen storage computing unit 206 computes an oxygen storage volume by using a corrected center air/fuel ratio; therefore, an oxygen storage volume is computed accurately.

Because the catalyst deterioration determining unit 708 determines deterioration of the catalyst based on an oxygen storage volume accurately computed by the oxygen storage volume computing unit 206, an accurate diagnosis result can be obtained when determining catalyst deterioration.

Figure 11:
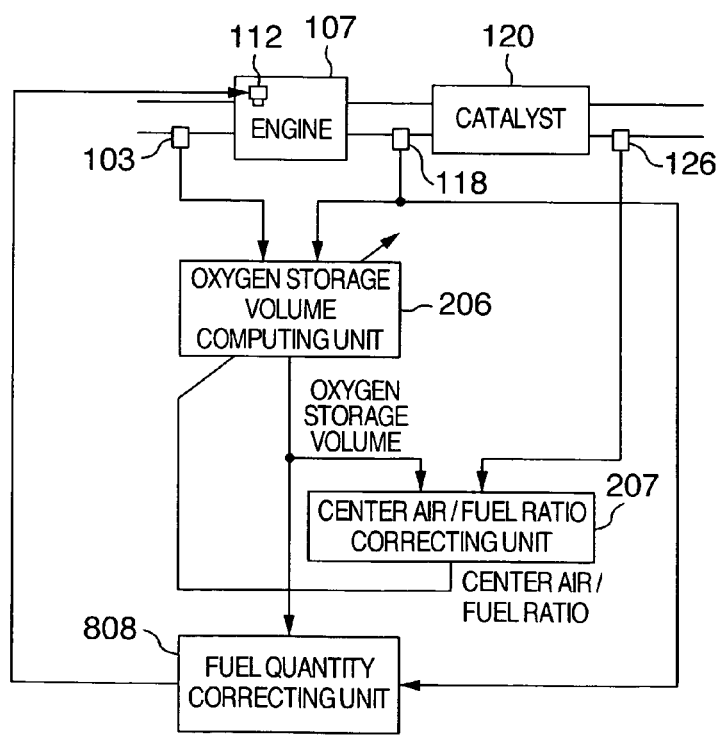
FIG. 11 is a block diagram showing a general outline of yet another embodiment of the control apparatus for an internal combustion engine according to the present invention.

FIG. 11 shows a general outline of another embodiment of the control apparatus for an internal combustion engine (engine control apparatus) according to the present invention.

In this embodiment, the engine control apparatus comprises a fuel quantity correcting unit 808 in addition to the oxygen storage volume computing unit 206 and the center air/fuel ratio correcting unit 207.

The fuel quantity correcting unit 808 controls an air/fuel ratio based on an oxygen storage volume computed by the oxygen storage volume computing unit 206.

An oxygen storage volume obtained by the oxygen storage computing unit 206 is computed by using a center air/fuel ratio which is corrected by the center air/fuel ratio correcting unit 207, for which reason an oxygen storage volume in this embodiment is measured with a high measuring accuracy. Because the fuel quantity correcting unit 808 corrects a fuel quantity based on an oxygen storage volume obtained with superb accuracy, an oxygen storage volume in the catalyst can be controlled accurately, making it possible to realize exhaust control with high performance.

Figure 12:
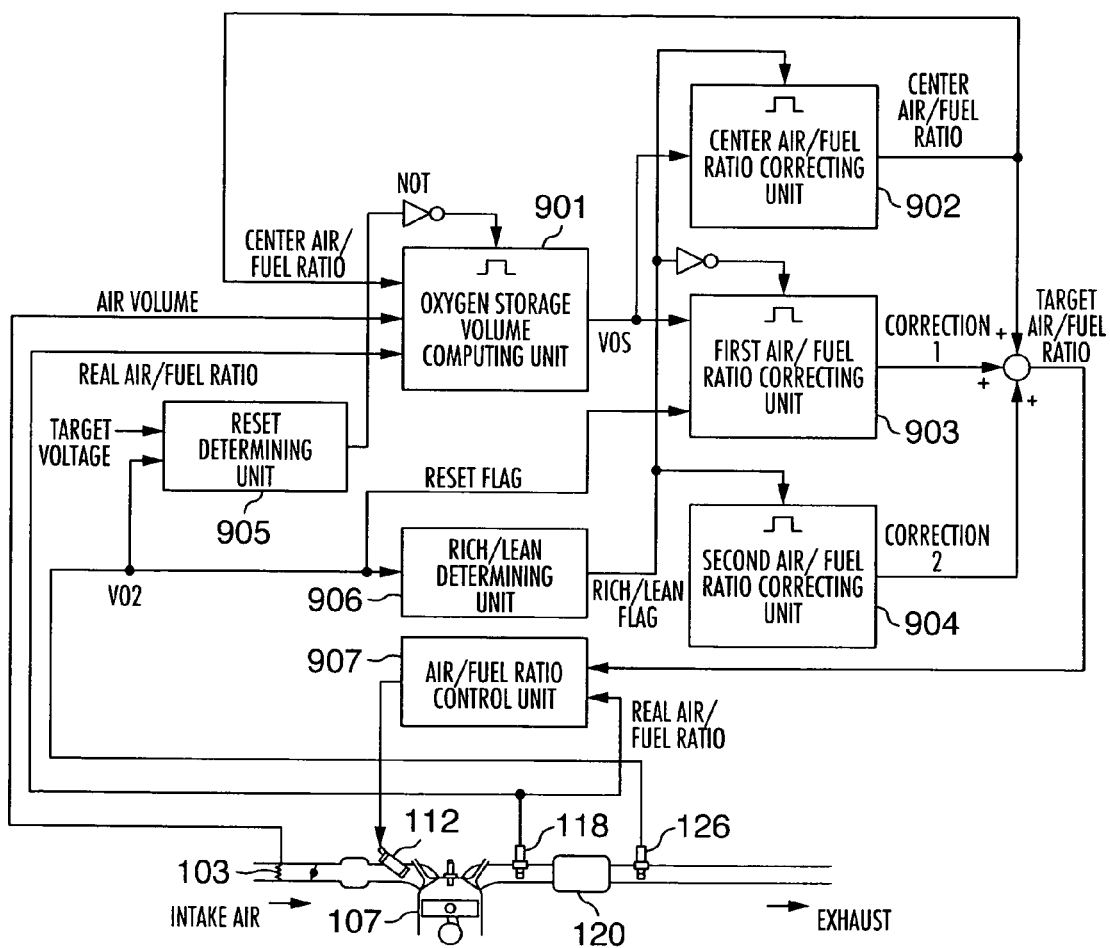
FIG. 12 is a block diagram showing a still further embodiment of the control apparatus for an internal combustion engine according to the present invention.

FIG. 12 shows a still further embodiment of the control apparatus of an internal combustion engine according to the present invention. In FIG. 12, the units corresponding to those in FIGS. 1 and 2 are designated by the same reference numbers as were used in FIGS. 1 and 2 and their descriptions are omitted.

In this embodiment, the control apparatus comprises an oxygen storage volume computing unit 901, a center air/fuel ratio correcting unit 902, a first air/fuel ratio correcting unit 903, a second air/fuel ratio correcting unit 904, a reset determining unit 905, a rich/lean determining unit 906, and an air/fuel ratio control unit 907.

The air/fuel control unit 907 controls a fuel injection quantity by the injector 112 so that an air/fuel ratio detected by the rear air/fuel ratio sensor 118 agrees with a target air/fuel ratio.

The oxygen storage volume computing unit 901 computes an oxygen storage volume (VOS) based on a center air/fuel ratio from the center air/fuel ratio correcting unit 902, a volume of intake air from the air flow sensor (intake air volume sensor) 103, and a real air/fuel ratio from the rear air/fuel ratio sensor 118 located before the catalyst.

However, the oxygen storage volume computing unit 901 is reset to 0 by the reset determining unit 905 which makes a reset decision when output VO2 of the rear $O_2$ sensor 126 reaches a target voltage (0.7V, for example).

The rich/lean determining unit 906 determines an ambient atmosphere based on output VO2 of the rear $O_2$ sensor 126, and when a rich determination or a lean determination is made, a rich/lean flag is set to "1".

When the rich/lean flag is set to 1, the center air/fuel ratio correcting unit 902 and the second target air/fuel ratio correcting unit 904 are started (operated). When the rich/lean flag is set to 0, the first target air/fuel ratio correcting unit 903 is started (operated).

Figure 13A:
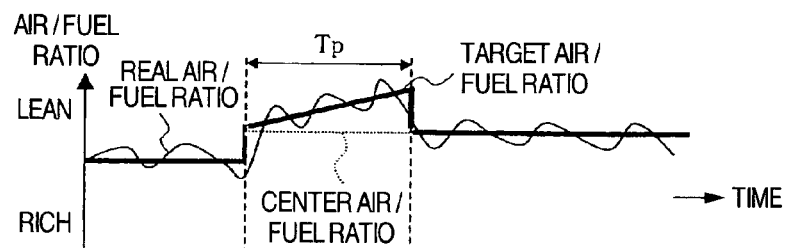
FIGS. 13A, 13B, and 13C are examples of time charts when the center air/fuel ratio correcting unit and the second target air/fuel ratio correcting unit in yet another embodiment operated, in which FIG. 3A indicates the center air/fuel ratio, the target air/fuel ratio, and the real air/fuel ratio, FIG. 13B indicates the oxygen storage volume, and FIG. 13C indicates the rear $O_2$ sensor voltage.
Figure 13B:
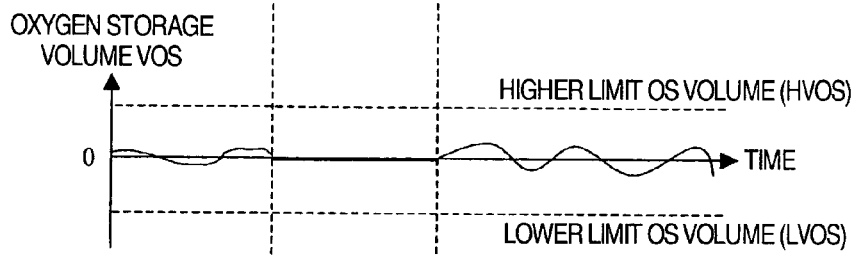
Figure 13C:
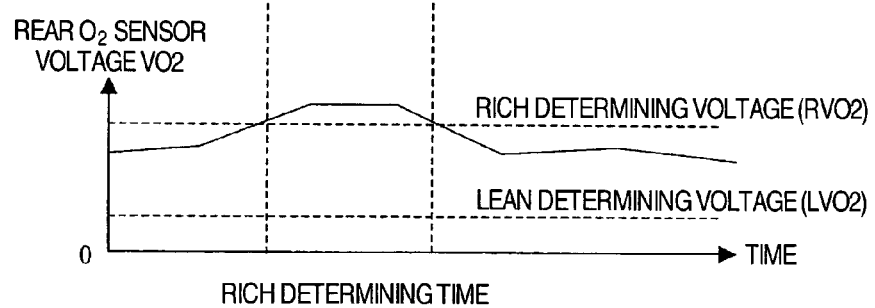

FIGS. 13A to 13C are examples of time charts when the center air/fuel ratio correcting unit 902 and the second target air/fuel ratio correcting unit 904 are operating.

In the time charts, in a time section Tp where the rear $O_2$ sensor voltage VO2 is higher than the rich determination voltage RVO2, the center air/fuel ratio is corrected to the lean side, and the target air/fuel ratio is set to a lean air/fuel ratio by the second target air/fuel ratio correcting unit 904 and the air/fuel ratio (real air/fuel ratio) is controlled to the lean side until the rear $O_2$ sensor voltage VO2 is caused to fall below the rich determination voltage RVO2.

Figure 14A:
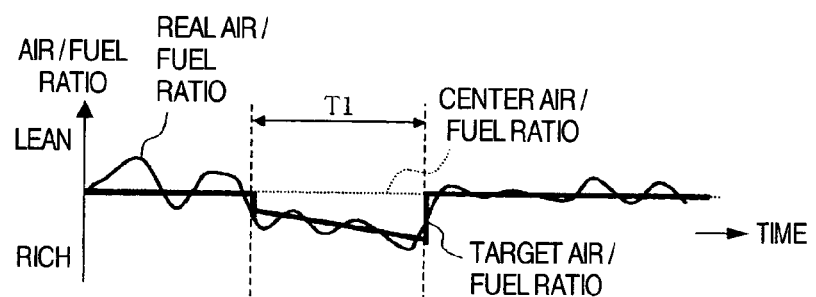
FIGS. 14A, 14B, and 14C are examples of charts when the first target air/fuel ratio correcting unit (903) in a further another embodiment in the embodiment in FIG. 12 operated, in which FIG. 14A indicates the center air/fuel ratio, the target air/fuel ratio, and the real air/fuel ratio, FIG. 14B indicates the oxygen storage volume, and FIG. 14C indicates the rear $O_2$ sensor voltage.
Figure 14B:
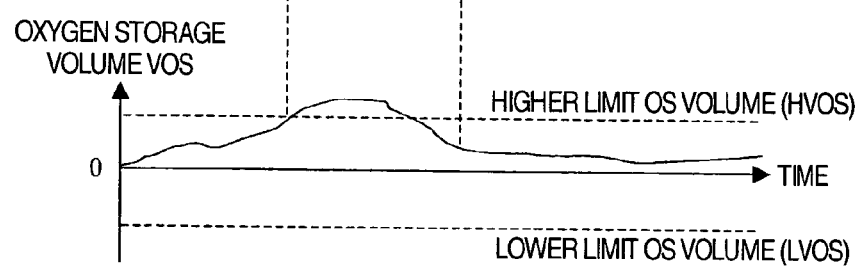
Figure 14C:
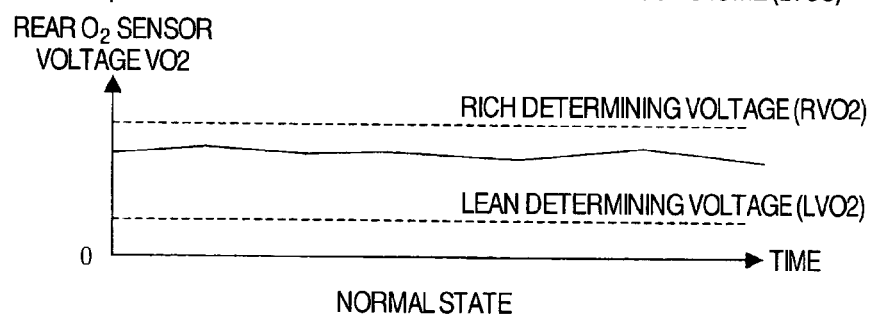

FIGS. 14A to 14C are examples of time charts in a normal state when the target air/fuel ratio correcting unit 903 is operating and the center air/fuel ratio is not corrected.

In the time charts, in a time section T1 where the oxygen storage volume VOS is higher than the higher limit oxygen storage volume HVOS, by setting a target air/fuel ratio to a rich air/fuel ratio and controlling an air/fuel ratio (real air/fuel ratio) to the lean side to decrease the oxygen storage volume VOS, the oxygen storage volume VOS of the catalyst can be kept within a predetermined range (between the higher limit VOS and the lower limit VOS).

By accurately estimating an oxygen storage volume VOS in the catalyst and keeping the oxygen storage volume VOS within a predetermined range, the conversion efficiency of the catalyst can be kept to a high level no matter what condition the car is in.

Figure 15:
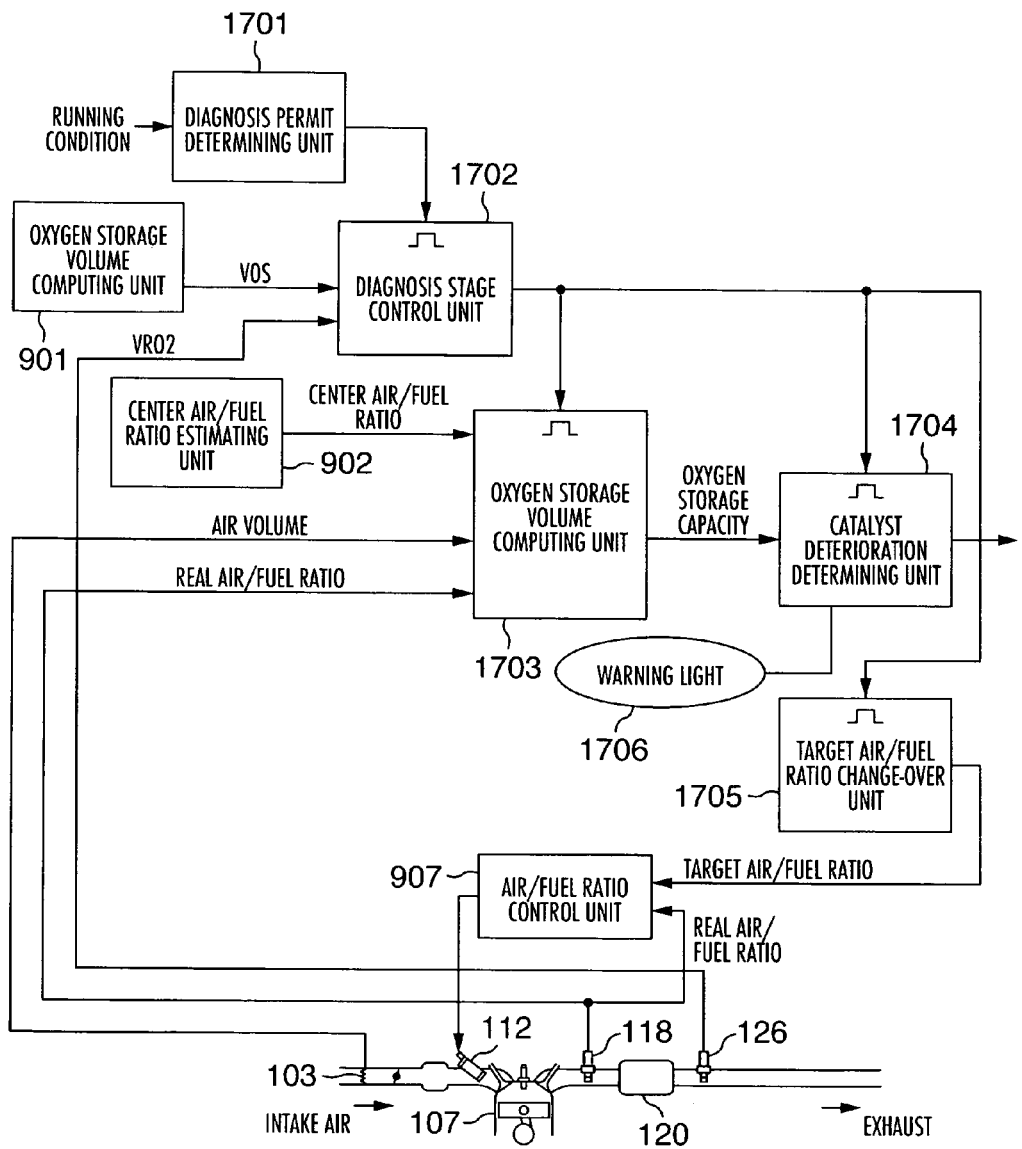
FIG. 15 is a block diagram showing a still another embodiment of the control apparatus for an internal combustion engine (engine control apparatus) of the present invention.

FIG. 15 shows a still another embodiment of the control apparatus for an internal combustion engine (engine control apparatus) according to the present invention. Incidentally, in FIG. 15, the units corresponding to those in FIG. 12 are designated by the same reference numbers in FIG. 12 and their descriptions are omitted.

In this embodiment, the engine control apparatus comprises an oxygen storage volume computing unit 901, a center air/fuel ratio correcting unit 902, an air/fuel control unit 907, a diagnosis permit determining unit 1701, a diagnosis-stages control unit 1702, an oxygen storage volume computing unit 1703, a catalyst deterioration determining unit 1704, and a target air/fuel ratio change-over unit 1705.

The diagnosis permit determining unit 1701 issues a catalyst diagnosis permit based on the running condition, and so on.

The diagnosis-stages control unit controls the diagnosis-stages (described later) based on an oxygen storage volume (VOS) calculated by the oxygen storage volume computing unit 901 and output (VRO2) of the rear $O_2$ sensor 126 when the catalyst diagnosis permit determining unit issues a diagnosis permit.

The target air/fuel ratio change-over unit 1705 changes over a target air/fuel ratio to rich or lean, which serves as a target to control a real air/fuel ratio by the air-fuel ratio control unit 907 in response to a diagnosis stage signal from the diagnosis-stages control unit.

The oxygen storage capacity computing unit 1703 computes an oxygen storage capacity in the catalyst while the air/fuel ratio is changed over, in other words, while a real air/fuel ratio is displaced from the center air/fuel ratio, and the catalyst deterioration determining unit 1704 turns on a warning light 1706 to call the user's attention when deterioration of the catalyst is determined from a decrease in the oxygen storage capacity.

The process flow of the engine control apparatus of an embodiment shown in FIG. 15 will be described with reference to the flowchart in FIG. 16.

In step 1801, the rear $O_2$ sensor voltage VO2 is measured, and in step 1802, an oxygen storage volume (VOS) is computed by using a deviation of a real air/fuel ratio from a center air/fuel ratio and an air flow rate.

In step 1803, it is determined whether or not the conditions for issuing a diagnosis permit have been established. If the conditions for diagnosis permit have been established, steps from S1804 on are executed.

The conditions for diagnosis permit include that the running condition satisfies a specified condition, that the conditions for computing an oxygen storage volume VOS are established (the air flow rate is within a range that enables an oxygen storage volume VOS to be computed, and the sensors for computation of oxygen storage volume are not judged abnormal, and so on), and that the catalyst is fully activated, for example.

In step S1804, the diagnosis-stages are controlled. More specifically, the transition of the stages is controlled in step S1804.

The stage 1 is intended to initialize a catalyst 120, the stage 2 is to measure the capacity of a catalyst 120, and the stage 3 is to determine the condition of a catalyst 120. Based on an oxygen storage volume VOS or output VO2 of the rear $O_2$ sensor 126, it is determined whether or not the condition for transition of each stage has been established. Thus, the stages of diagnosis are controlled.

In step S1805, it is determined whether or not the diagnosis stage is stage 1, and if it is stage 1, the process goes to step S1806 to initialize the catalyst 120.

In step S1807, it is determined whether or not the diagnosis stage is stage 2 now. If it is stage 2, the process moves on to step S1808, in which the capacity of the catalyst 120 is measured.

In step S1809, it is determined whether or not the diagnosis stage is step 3, and if it is stage 3, the process proceeds to step 1810, in which the condition of the catalyst is determined.

Figure 16:
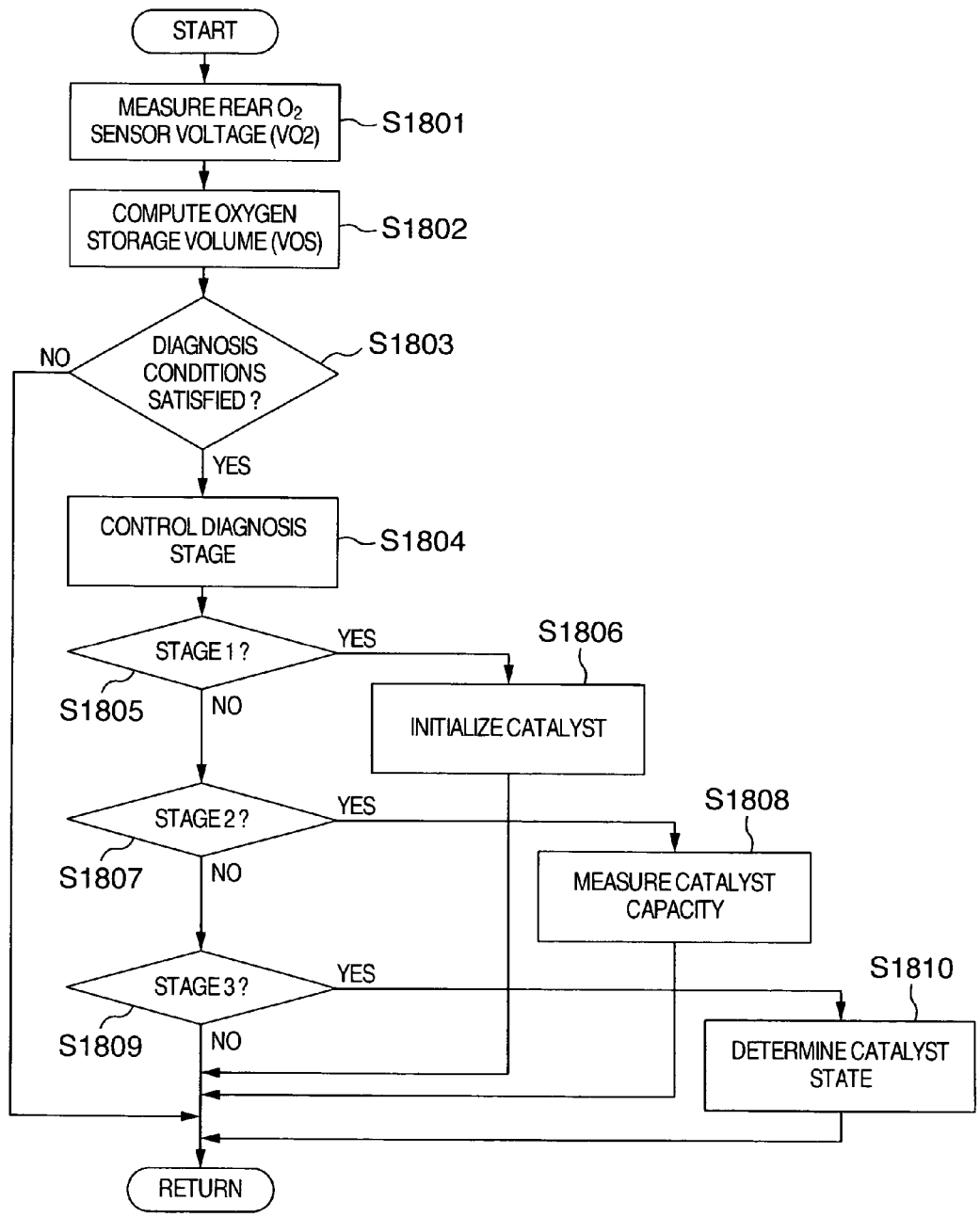
FIG. 16 is a flowchart showing a process flow of the engine control apparatus shown in FIG. 15.
Figure 17:
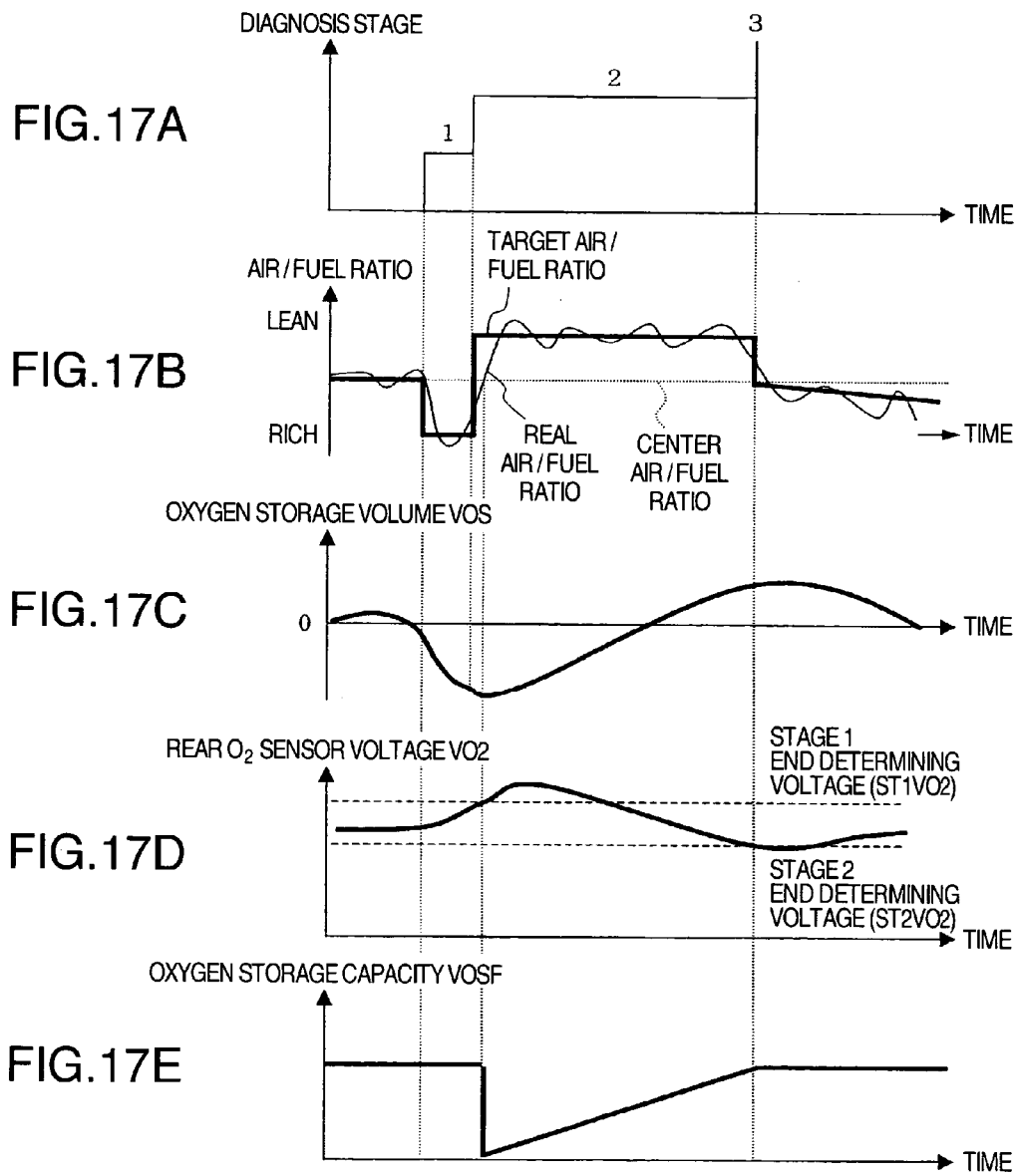
FIGS. 17A, 17B, 17C, 17D, and 17E are examples of time charts when the process flow shown in the flowchart of FIG. 16 was executed, in which FIG. 17A indicates the diagnosis-stages, FIG. 17B indicates the center air/fuel ratio, the target air/fuel ratio, and the real air/fuel ratio, FIG. 17C indicates the oxygen storage volume, FIG. 17D indicates the rear $O_2$ sensor voltage, and FIG. 17E indicates the oxygen storage capacity.

FIGS. 17A to 17E are examples of time charts when the process flow shown in the flowchart of FIG. 16 was executed.

A target air/fuel ratio is controlled based on a diagnosis stage signal outputted by the diagnosis stage control unit.

In stage 1, to initialize the catalyst 120, a real air/fuel ratio is controlled to the rich side to cause a real air/fuel ratio to go to the rich side and remain rich until the rear $O_2$ sensor voltage VO2 reaches a stage-1 end deciding voltage ST1VO2.

In stage 2, the target air/fuel ratio is switched to the lean side and after the real air/fuel ratio crosses the center air/fuel ratio and becomes lean, an oxygen storage capacity VOSF is computed until the rear $O_2$ sensor voltage VO2 reaches a stage-2 end deciding voltage ST2VO2.

In stage 3, the target air/fuel ratio is pulled down to a value in normal exhaust control and it is determined if there is abnormality in the catalyst 120 based on the oxygen storage capacity VOSF.

Figure 18:
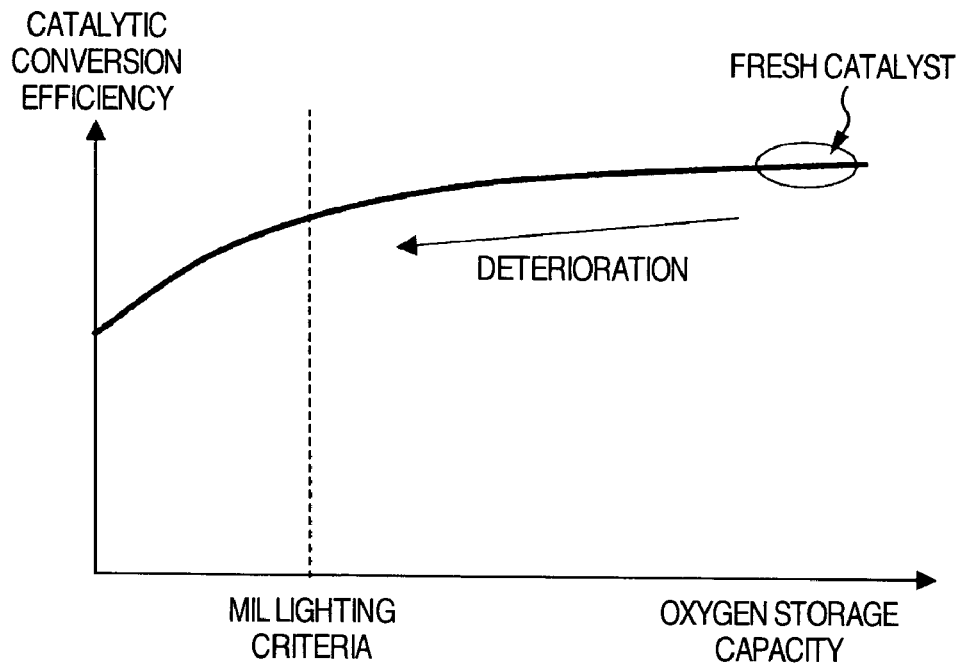
FIG. 18 is a graph showing a relation between the oxygen storage volume and the catalytic conversion efficiency.
Figure 20:
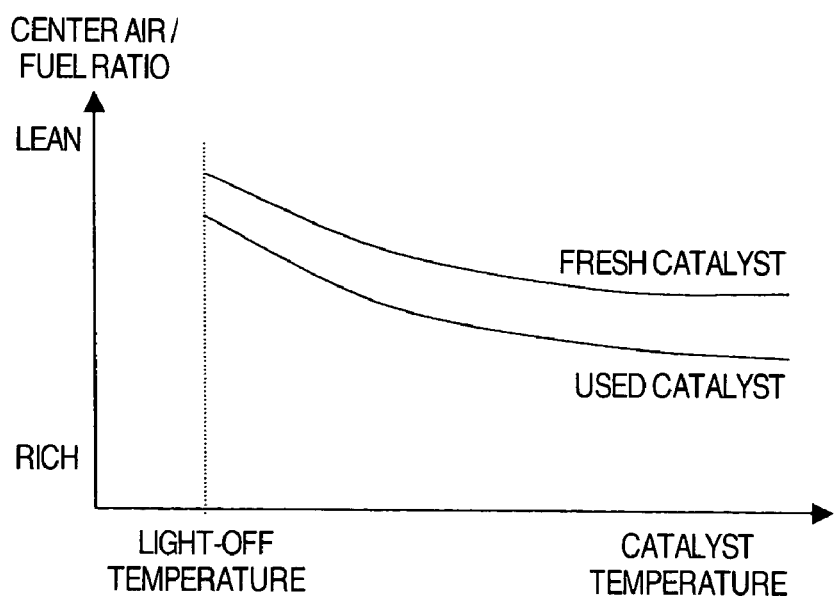
FIG. 20 is a graph showing characteristic of the center air/fuel ratio of the catalyst.
Figure 19A:
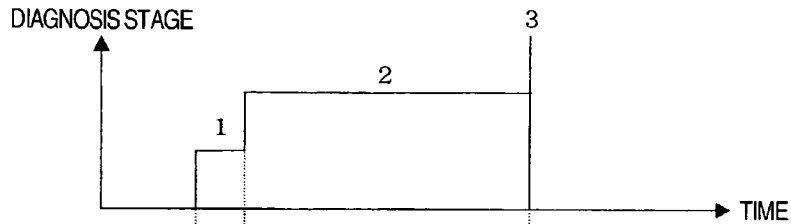
FIGS. 19A, 19B, 19C, 19D and 19E are other examples of time charts when the process flow shown in the flowchart of FIG. 16 was executed, in which FIG. 19A indicates the diagnosis-stages, FIG. 19B indicates the center air/fuel ratio, the target air/fuel ratio, the real air/fuel ratio, FIG. 19C indicates the oxygen storage volume, FIG. 19D indicates the rear $O_2$ sensor voltage, and FIG. 19E indicates the oxygen storage capacity.
Figure 19B:
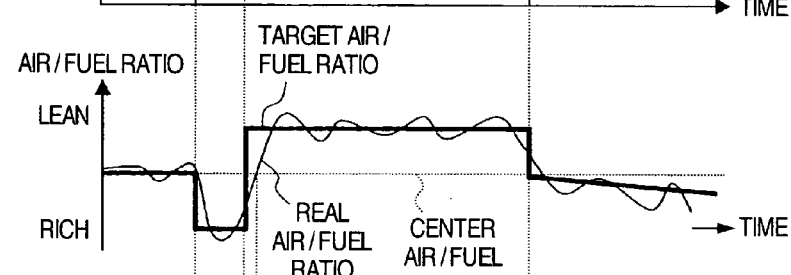
Figure 19C:
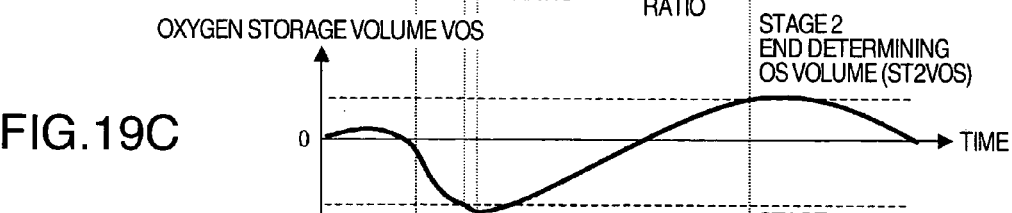
Figure 19D:
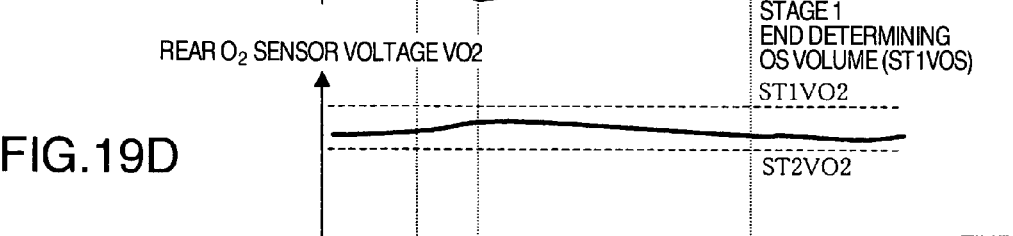
Figure 19E:
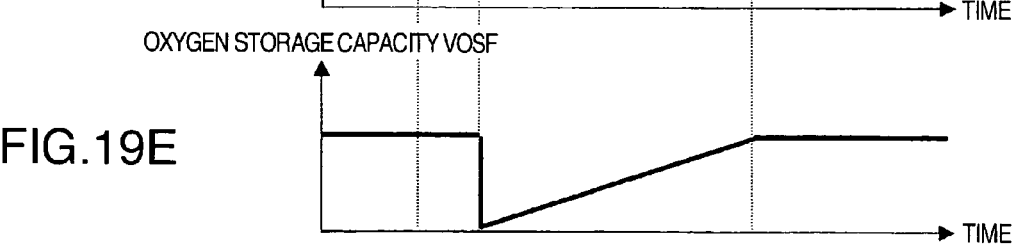
Figure 21A:
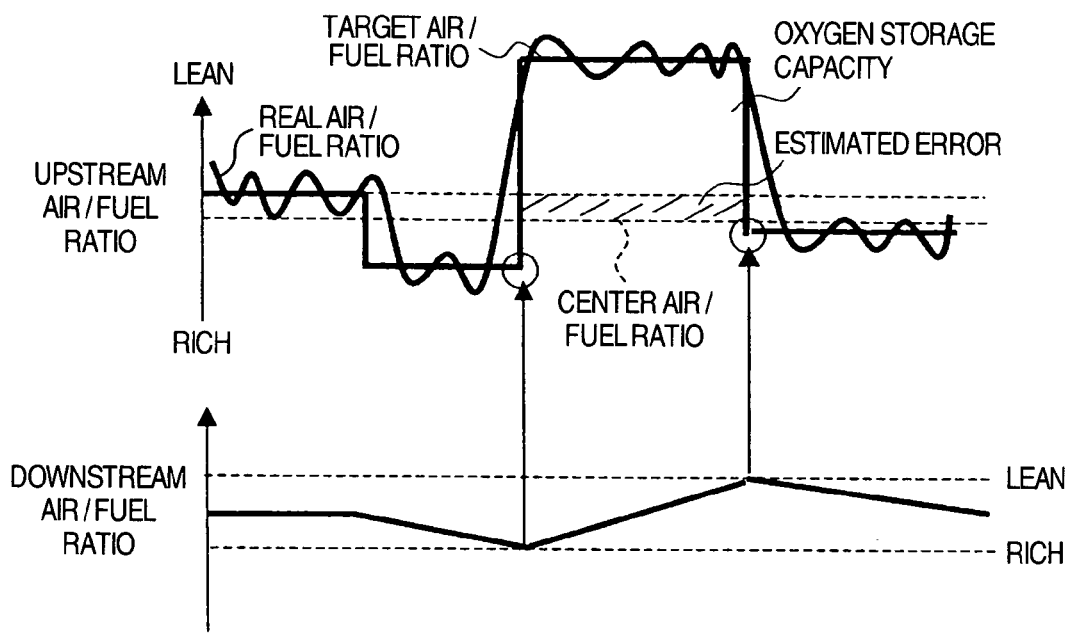
FIGS. 21A and 21B are diagrams for explaining problems in catalyst diagnosis based on oxygen storage volume in prior art.
Figure 21B:
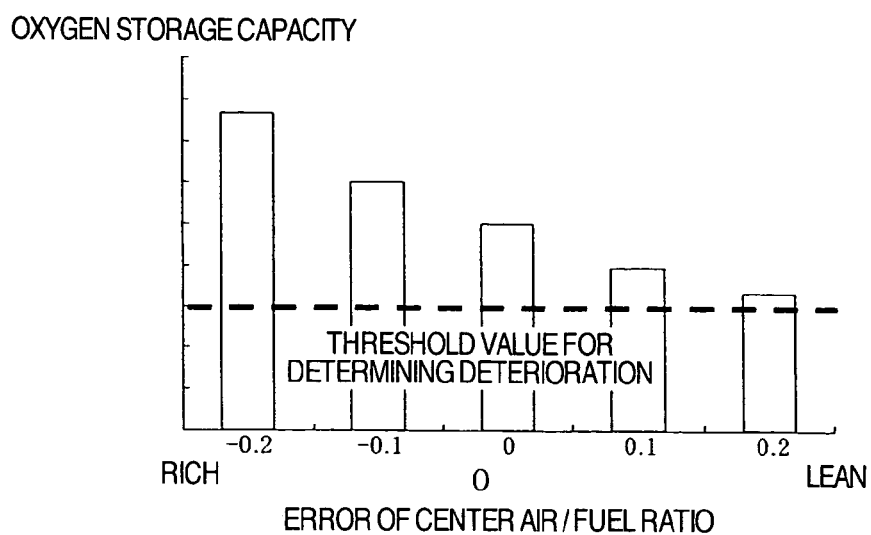

FIG. 18 shows a relation between the oxygen storage capacity VOSF and the catalytic conversion efficiency. As the catalyst 120 deteriorates, the oxygen storage capacity VOSF decreases and the catalytic conversion efficiency falls. Therefore, when a measured oxygen storage capacity VOSF becomes smaller than in the MIL (warning light) lighting criteria previously provided by regulations or the like, the catalyst is determined as abnormal.

FIGS. 19A to 19E are other examples of time charts when the process flow shown in the flowchart in FIG. 16 was executed.

If a real air/fuel ratio is switched between rich and lean until the rear $O_2$ sensor voltage VO2 touches the stage-1 end deciding voltage ST1VO2 and the stage-2 end deciding voltage ST2VO2 (in the embodiment in FIG. 17), it takes time for a new catalyst to clean exhaust emissions, leaving chances for the exhaust emissions to deteriorate.

Description will be made of a case where by controlling the stages based on an oxygen storage volume VOS, the catalyst can only be determined as abnormal, though an accurate oxygen storage capacity is not estimated.

In stage 1, to initialize the catalyst 120, a real air/fuel ratio is controlled to the rich side to cause a real air/fuel ratio to go to the rich side and remain rich until the oxygen storage volume VOS reaches the stage-1 end deciding oxygen storage volume ST1VOS.

In stage 2, the target air/fuel ratio is switched to the lean side and after the real air/fuel ratio passes the center air/fuel ratio and becomes lean, an oxygen storage volume VOSF is computed until the oxygen storage volume reaches the state-2 end deciding oxygen storage volume ST2VOS.

In stage 3, the target air/fuel ratio is pulled down to a value in normal exhaust control and it is determined if there is abnormality in the catalyst 120 based on the oxygen storage capacity VOSF.

The stage-1 end oxygen storage volume ST1VOS and the stage-2 end oxygen storage volume ST2 VOS have only to be larger than in the above-mentioned MIL lighting criteria. Since the rear $O_2$ sensor voltage VO2 need not be deflected, there are no chances for worsening of exhaust emissions. Incidentally, in a case where an oxygen storage volume is controlled to a predetermined value, the stage 1 may be omitted.

As described above, by correcting the center air/fuel ratio to improve the computation accuracy of an oxygen storage volume of the catalyst, the catalyst can always be diagnosed with high accuracy.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A control apparatus for an internal combustion engine having an oxygen storage volume computing unit for computing an oxygen storage volume of a catalyst by using a real air/fuel ratio detected by a front air/fuel ratio sensor for detecting exhaust components, said front air/fuel ratio sensor being installed on the upstream side of the catalyst, a center air/fuel ratio representing a stoichiometric air/fuel ratio of the catalyst, and an intake air volume obtained by means for estimating or detecting a flow rate of air flowing into the catalyst, the control apparatus comprising:

center air/fuel ratio correcting means for correcting the center air/fuel ratio based on output of a rear air/fuel ratio sensor installed on the downstream side of the catalyst and an oxygen storage volume computed by the oxygen storage volume computing means;

wherein said center air/fuel ratio correcting means includes a first catalyst air/fuel ratio estimating unit for estimating an air/fuel ratio in said catalyst based on output of the rear air/fuel ratio sensor; a second catalyst air/fuel ratio estimating unit for estimating an air/fuel ratio in said catalyst based on an oxygen storage volume computed by said oxygen storage volume computing means; and a center air/fuel ratio correction unit for correcting said center air/fuel ratio based on an estimated air/fuel ratio from said first catalyst air/fuel ratio estimating means and an estimated air/fuel ratio outputted from said second catalyst air/fuel ratio estimating unit.

2. The control apparatus for an internal combustion engine according to claim 1, wherein said center air/fuel ratio correcting means corrects said center air/fuel ratio toward the lean side when an estimated air/fuel ratio by the first catalyst air/fuel ratio estimating unit is rich and an estimated air/fuel ratio by said second catalyst air/fuel ratio estimating unit is not rich, and corrects said center air/fuel ratio toward the rich side when said estimated air/fuel ratio by said first catalyst air/fuel ratio estimating unit is lean and said second catalyst air/fuel ratio estimating unit not lean.

3. The control apparatus for an internal combustion engine according to claim 1, wherein said center air/fuel ratio correcting means corrects said center air/fuel ratio correcting means corrects said center air/fuel ratio toward the lean side when said estimated air/fuel ratio by said first catalyst air/fuel ratio estimating means is stoichiometric and said estimated air/fuel ratio by said second catalyst air/fuel ratio estimating means is lean, and corrects said center air/fuel ratio toward the rich side when said estimated air/fuel ratio by said first catalyst air/fuel ratio estimating unit is stoichiometric and said estimated air/fuel ratio by said second catalyst air/fuel ratio estimating means is rich.

4. The control apparatus for an internal combustion engine according to claim 1, further comprising catalyst deterioration determining means for determining deterioration of said catalyst based on an oxygen storage volume computed by said oxygen storage volume computing means.

5. The control apparatus for an internal combustion engine according to claim 1, further comprising fuel quantity correcting means for correcting a fuel quantity injected by an injector based on an oxygen storage volume computed by said oxygen storage volume computing means.

6. A control apparatus for an internal combustion engine having air/fuel ratio control means for controlling an air/fuel ratio so that an air/fuel ration detected by a front air/fuel ratio sensor installed on the upstream side of a catalyst agrees with a target air/fuel ratio, said control apparatus comprising:

oxygen storage volume computing means for computing an oxygen storage volume of the catalyst based on a volume of air flowing into said catalyst, a real air/fuel ratio, and the center air/fuel;

rich/lean determining means for determining whether said air/fuel ratio is rich or lean based on output of a rear O2 sensor on the downstream side of the catalyst;

center air/fuel ratio correcting means for estimating said center air/fuel ratio based on an oxygen storage volume computed by said oxygen storage volume computing means and output of said rear O2 sensor;

first target air/fuel ratio correcting means for correcting a target air/fuel ratio based on an oxygen storage volume computed by the oxygen storage volume computing means; and second target air/fuel ratio correcting means for correcting said target air/fuel ratio when a rich/lean determination has been made by said rich/lean determining means;

diagnosis permit determining means for determining whether to issue a permit to diagnose the catalyst based on a running condition or the like;

diagnosis-stages control means for controlling a diagnosis process based on an oxygen storage volume computed by the oxygen storage volume computing means and output of the rear O2 sensor;

target air/fuel ratio change-over means for changing over a target air/fuel ratio based on output of said diagnosis-stages control means;

oxygen storage capacity computing means for computing an oxygen storage capacity in said catalyst while a real air/fuel ratio is displaced from a center air/fuel ratio, oxygen storage capacity computing means for computing said oxygen storage capacity in said catalyst during execution of change-over of said air/fuel ratio; and catalyst deterioration determining means for determining the deterioration of said catalyst based on said oxygen storage capacity.

7. The control apparatus for an internal combustion engine according to claim 6, wherein other than when a rich determination or a lean determination has been made by said rich/lean determining means, said target air/fuel ratio is corrected to make said oxygen storage volume in said catalyst fall in a specified range by said first air/fuel ratio correcting means.

8. The control apparatus for an internal combustion engine according to claim 6, wherein when a rich/lean determination has been made by said rich/lean determining means, at least one of two correction processes is performed: either center air/fuel ratio correction by said center air/fuel ratio correcting means or target air/fuel ratio correction intended to make output of said rear O2 sensor stoichiometric by said second target air/fuel ratio correcting means.

9. The control apparatus for an internal combustion engine according to claim 6, wherein said diagnosis-stages control means controls said diagnosis-stages based on either output of said rear air/fuel ratio sensor or said oxygen storage volume.

10. A control method of an internal combustion engine having an oxygen storage volume computing unit for computing an oxygen storage volume of a catalyst by using a real air/fuel ratio detected by a front air/fuel ratio sensor for detecting exhaust components, said front air/fuel ratio sensor being installed on the upstream side of the catalyst, a center air/fuel ratio representing a stoichiometric air/fuel ratio of the catalyst, and an intake air volume obtained by means for estimating or detecting a flow rate of air flowing into the catalyst, center air/fuel ratio correcting means for correcting the center air/fuel ratio based on output of a rear air/fuel ratio sensor installed on the downstream side of the catalyst and an oxygen storage volume computed by the oxygen storage volume computing means, comprising:

correcting said center air/fuel ratio based on an output of a rear air/fuel ratio sensor installed on the downstream of said catalyst and an oxygen storage volume computed by said oxygen storage volume computing means by firstly estimating an air/fuel ratio in said catalyst based on output of the rear air/fuel ratio sensor; secondly estimating an air/fuel ratio in said catalyst based on an oxygen storage volume computed by said oxygen storage volume computing means; and then correcting said center air/fuel ratio based on an estimated air/fuel ratio from said first and second estimating steps.

* * * * *